US008925046B2

(12) United States Patent
Ogura et al.

(10) Patent No.: US 8,925,046 B2
(45) Date of Patent: Dec. 30, 2014

(54) DEVICE, METHOD, AND RECORDING MEDIUM

(71) Applicant: Fujitsu Limited, Kawasaki-shi, Kanagawa (JP)

(72) Inventors: Takao Ogura, Yokohama (JP); Fumihiko Kozakura, Hachioji (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/775,707

(22) Filed: Feb. 25, 2013

(65) Prior Publication Data

US 2013/0312067 A1 Nov. 21, 2013

(51) Int. Cl.
*H04L 29/06* (2006.01)

(52) U.S. Cl.
CPC ............ *H04L 65/1069* (2013.01); *H04L 63/08* (2013.01); *H04L 63/061* (2013.01)
USPC ........ 726/4; 726/27; 726/28; 726/29; 726/30; 713/168; 713/169; 713/170; 713/171; 713/172; 713/173; 713/174; 713/182; 713/183; 713/184; 713/185; 713/186

(58) Field of Classification Search
CPC .............................................. H04L 29/06823
USPC ........... 713/168–174, 182–186; 726/27–30, 4
See application file for complete search history.

(56) References Cited

U.S. PATENT DOCUMENTS

| 6,377,993 | B1 * | 4/2002 | Brandt et al. ................. 709/227 |
| 6,823,070 | B1 * | 11/2004 | Smith et al. ................... 380/286 |
| 6,937,730 | B1 * | 8/2005 | Buxton ......................... 380/241 |
| 7,562,397 | B1 * | 7/2009 | Mithal et al. .................... 726/33 |
| 8,181,011 | B1 * | 5/2012 | Chang ........................... 713/152 |
| 8,364,956 | B2 * | 1/2013 | Ju et al. ......................... 713/166 |
| 2002/0144119 | A1 * | 10/2002 | Benantar ....................... 713/171 |
| 2010/0161966 | A1 * | 6/2010 | Kwon et al. ................... 713/155 |

FOREIGN PATENT DOCUMENTS

| JP | 2005-309846 | 11/2005 |
| JP | 2010-287078 | 12/2010 |

\* cited by examiner

*Primary Examiner* — Josnel Jeudy
(74) *Attorney, Agent, or Firm* — Oblon, Spivak, McClelland, Maier & Neustadt, L.L.P.

(57) ABSTRACT

A device includes a memory which stores a program, and a processor which executes, based on the program, a procedure comprising establishing a session with a request source when a request for a service, made to a second providing source, has been received from the request source, the second providing source providing the service based on data stored in a first providing source; and when an inquiry about whether to transmit the data to the second providing source has been received from the first providing source, notifying, so as to encrypt a mask range of the data, the first providing source of session information indicating the session established with the request source and notifying the request source of the session information so as to decrypt the encrypted mask range of data based on the session information.

15 Claims, 18 Drawing Sheets

FIG. 2

| NAME | ID | DATE OF BIRTH | GENDER | MEDICATION HISTORY | GOT | GPT | HbA1C | PSA |
|---|---|---|---|---|---|---|---|---|
| asdfurhd24 | F0210 | 34251293 | M | orut321qw | 18 | 20 | 4.8 | 1.2 |
| sdferfv34x | K0321 | 84756253 | M | rhgu49tuf | 21 | 18 | 5.1 | 2.31 |
| ... | ... | ... | ... | ... | | | | ... |

MASKED DATA | ANALYSIS TARGET DATA

FIG. 7

| TENANT ID | USER ID | SERVICE URL | ID | PASSWORD |
|---|---|---|---|---|
| TENANT A | USER 001 | https://service1.com | S1yyyy | PWyyyy |
| TENANT B | USER 002 | https://service2.com | S2zzzz | PWzzzz |

| SESSION ID | TENANT ID | USER ID | COLLABORATION SOURCE SERVICE URL | COLLABORATION SOURCE SESSION ID | COLLABORATION DESTINATION SERVICE URL | COLLABORATION DESTINATION SESSION ID |
|---|---|---|---|---|---|---|
| ... | ... | ... | ... | ... | ... | ... |
| abcd0231 | TENANT A | USER 001 | https://service1.com | yyyyyy | https://service2.com | zzzzzzz |

DEVICE, METHOD, AND RECORDING MEDIUM

CROSS-REFERENCE TO RELATED APPLICATION

This application is based upon and claims the benefit of priority of the prior Japanese Patent Application No. 2012-115905, filed on May 21, 2012, the entire contents of which are incorporated herein by reference.

FIELD

The embodiments discussed herein are related to a device, a method, and a recording medium.

BACKGROUND

There has been known a technique of service collaboration providing a new service with causing a plurality of services to collaborate with one another. For example, as an example of such service collaboration, a technique has been known that causes a data storage service storing the data of a user and a data analysis service acquiring the data of a user from the data storage service and analyzing the acquired data to collaborate with each other.

Such a technique has been disclosed in Japanese Laid-open Patent Publication No. 2010-287078 or Japanese Laid-open Patent Publication No. 2005-309846.

SUMMARY

According to an aspect of the invention, a device includes a memory which stores a program, and a processor which executes, based on the program, a procedure comprising establishing a session with a request source when a request for a service, made to a second providing source, has been received from the request source, the second providing source providing the service based on data stored in a first providing source; and when an inquiry about whether to transmit the data to the second providing source has been received from the first providing source, notifying, so as to encrypt a mask range of the data, the first providing source of session information indicating the session established with the request source and notifying the request source of the session information so as to decrypt the encrypted mask range of data based on the session information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram for explaining an example of data an enterprise private cloud transmits;

FIG. 7 is a diagram for explaining an example of an ID management table according to the first embodiment;

FIG. 8 is a diagram for explaining an example of a session management table a gateway server includes;

DESCRIPTION OF EMBODIMENTS

Figure 1:
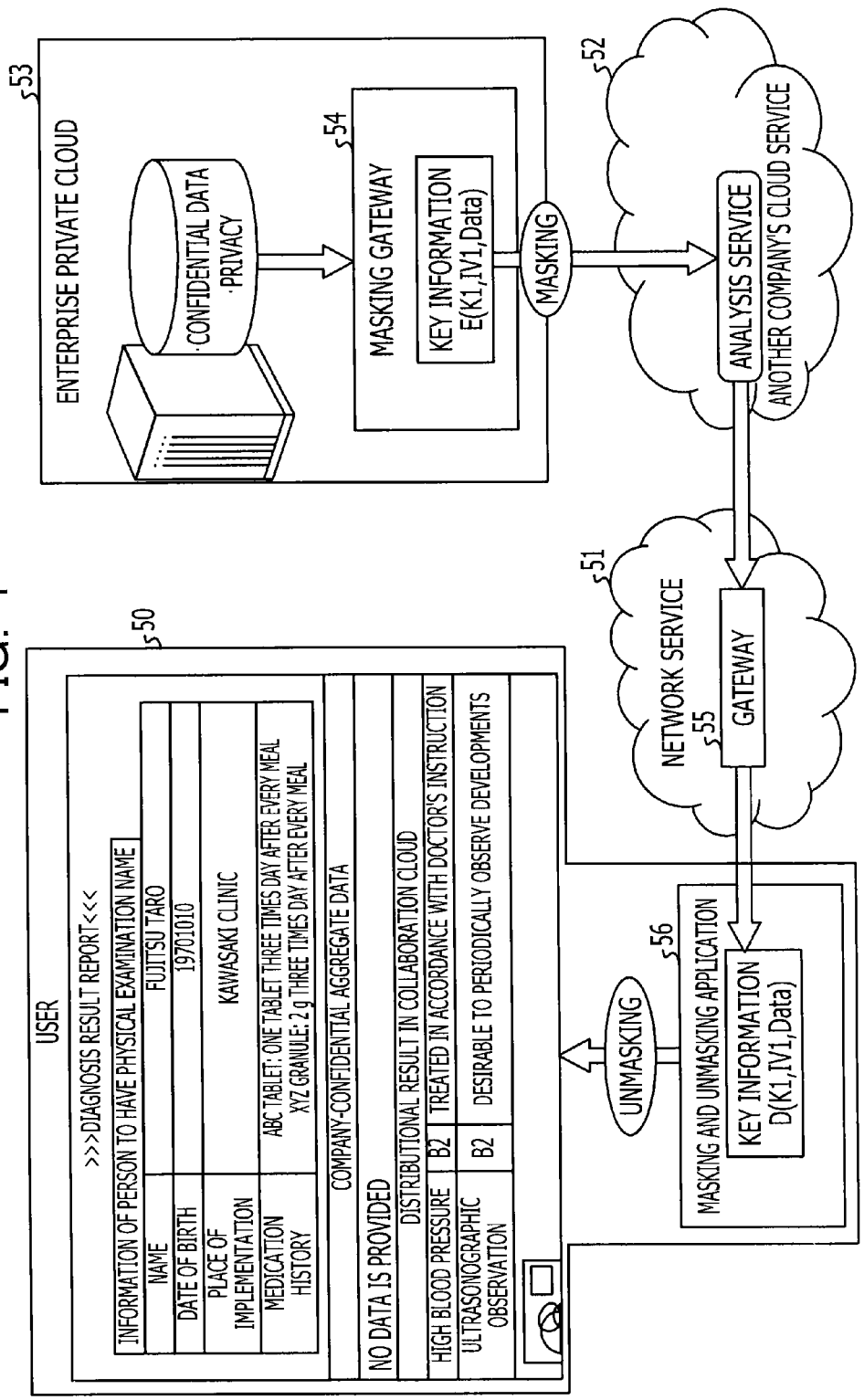
FIG. 1 is a diagram for explaining an example of service collaboration.

First, using FIG. 1, collaboration between a data storage service and a data analysis service will be described. FIG. 1 is a diagram for explaining an example of service collaboration. In addition, in the example illustrated in FIG. 1, an example is illustrated where an enterprise private cloud 53 provides the data storage service and another company's cloud service 52 provides the data analysis service.

For example, a user 50 stores, in the enterprise private cloud 53, data including confidential data or privacy information. In addition, the user 50 requests the other company's cloud service 52 to analyze the data stored in the enterprise private cloud 53. In response to this, the other company's cloud service 52 requests, from the enterprise private cloud 53, the data the user 50 has stored.

Here, since the data stored in the enterprise private cloud 53 includes the confidential data or the privacy information, the user 50 does not want to deliver, in unchanged form, the data to the other company's cloud service 52. Therefore, using key information a masking gateway 54 stores therein, the enterprise private cloud 53 encrypts and then transmits the confidential data or the privacy information, included in the data, to the other company's cloud service 52.

Here, FIG. 2 is a diagram for explaining an example of data an enterprise private cloud transmits. In the example illustrated in FIG. 2, an example is described where the user 50 stores the medication history data of a plurality of persons in the enterprise private cloud 53. For example, from among the pieces of data illustrated in FIG. 2, the enterprise private cloud 53 encrypts a masked data portion such as a name serving as the privacy information. In addition, with respect to the range of analysis target data to be analyzed by the other company's cloud service 52, the enterprise private cloud 53 does not perform encryption.

Returning to FIG. 1, when having received the data from the enterprise private cloud 53, the other company's cloud service 52 analyzes the range of the analysis target data, and transmits an analysis result to the user 50 through a gateway 55 in a network service 51. In response to this, using the same key information as the masking gateway 54, a masking and unmasking application 56 the user 50 has unmasks the masked data portion and obtains the analysis result.

In the above-mentioned case where the plural services are caused to collaborate with one another, there is a problem that the change or the acceptance or delivery of the key information used for masking the data may be difficult.

Figure 3:
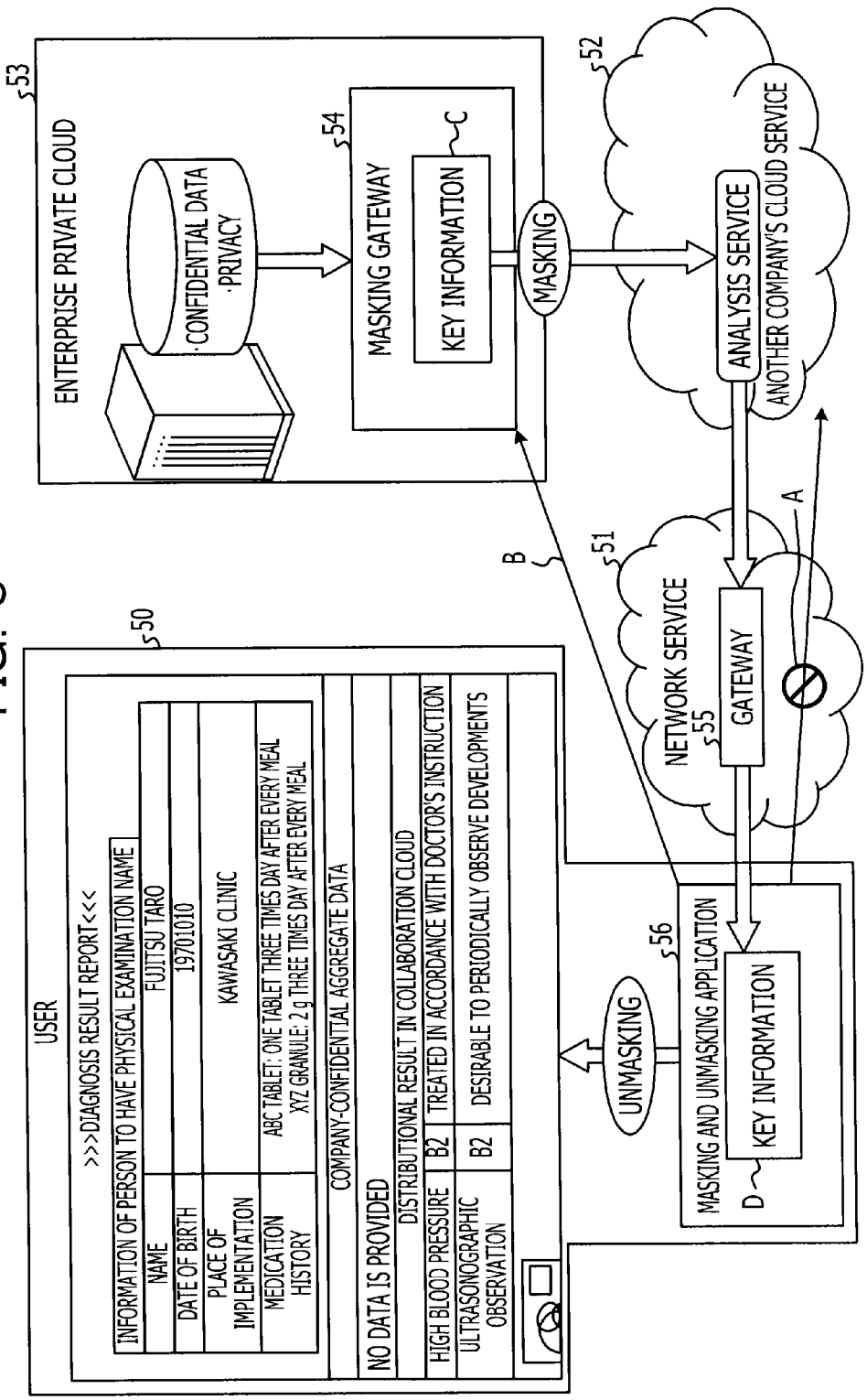
FIG. 3 is a diagram for explaining change of key information.

FIG. 3 is a diagram for explaining the change of key information. For example, when changing the key information, the masking and unmasking application 56 notifies the masking gateway 54 of new key information. However, so as to avoid deciphering of the data masked by the other company's cloud service 52, it is undesirable that the key information is accepted or delivered through the other company's cloud service 52 as illustrated in A in FIG. 3.

In addition, when, as illustrated in B in FIG. 3, the key information is directly delivered to the enterprise private cloud 53, the masking and unmasking application 56 does not recognize a correspondence relationship between the key information and the data received from the other company's cloud service 52, and in some cases, it may be difficult to unmask the masked data.

For example, using key information illustrated in C in FIG. 3, the masking gateway 54 encrypts the data, and transmits the encrypted data to the other company's cloud service 52. After that, before receiving the data from the other company's cloud service 52, the masking and unmasking application 56 transmits, as new key information, key information illustrated in D in FIG. 3 to the masking gateway 54. In response to this, the masking gateway 54 updates the key information illustrated in C in FIG. 3 to the newly received key information.

However, it may be difficult for the masking and unmasking application 56 to determine by which of the key information illustrated in C in FIG. 3 and the key information illustrated in D in FIG. 3 the data received from the other company's cloud service 52 has been encrypted. Therefore, in some case, it may be difficult for the masking and unmasking application 56 to unmask the data received from the other company's cloud service 52.

Hereinafter, a service request device, a service providing system, a service request method, and a service request program according to a preferred embodiment of the present application will be described with reference to accompanying drawings.

Figure 4:
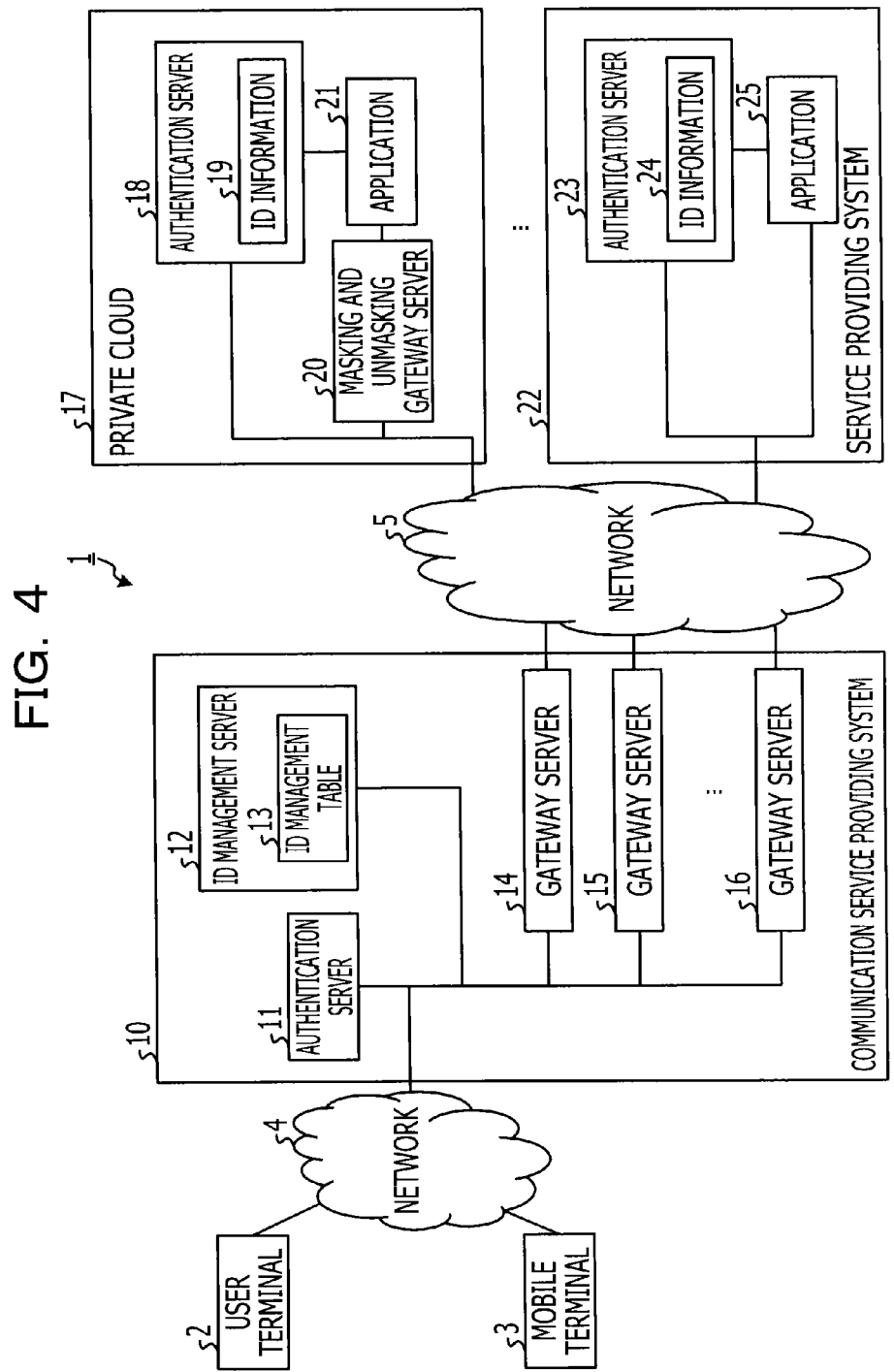
FIG. 4 is a diagram for explaining a communication system according to a first embodiment.

In the following first embodiment, using FIG. 4, one example of a communication system will be described where a plurality of services are caused to collaborate with one another and provided to a user. FIG. 4 is a diagram for explaining a communication system according to the first embodiment. In addition, a communication system 1 includes at least two service providing sources providing services to a user and a server performing authentication of a user with respect to each of the service providing sources.

As illustrated in FIG. 4, the communication system 1 includes a user terminal 2, a mobile terminal 3, a network 4, a network 5, a communication service providing system 10, a private cloud 17, and a service providing system 22. In addition, the user terminal 2 and the mobile terminal 3 are coupled to the communication service providing system 10 through the network 4. In addition, the communication service providing system 10 is coupled to the private cloud 17 and the service providing system 22 through the network 5.

In addition, the communication service providing system 10 includes an authentication server 11, an Identification (ID) management server 12, and a plurality of gateway servers 14 to 16. In addition, the ID management server 12 stores therein an ID management table 13 where an ID and a password, used by a user to log in to the private cloud 17 and the service providing system 22, are associated with the user.

On the other hand, the private cloud 17 includes an authentication server 18 and a masking and unmasking gateway server 20, and causes an application 21 to operate. In addition, the authentication server 18 stores therein ID information 19 used for performing authentication of a user who requests the private cloud 17 to provide a service. In addition, the service providing system 22 includes an authentication server 23, and causes an application 25 to operate. In addition, the authentication server 23 stores therein ID information 24 used for performing authentication of a user who requests the service providing system 22 to provide a service.

In addition, the private cloud 17 and the service providing system 22 individually provide different services to a user of the user terminal 2 or the mobile terminal 3. For example, the private cloud 17 provides, to the user, a service for managing data the user deposits. In addition, the service providing system 22 provides, to the user, a service for acquiring data the private cloud 17 manages and analyzing the acquired data.

In such a communication system 1, when having received a service request to request the service providing system 22 to provide a service, from the user terminal 2 or the mobile terminal 3 through the network 4, the communication service providing system 10 performs the following processing. In other words, the communication service providing system 10 performs proxy authentication of the user terminal 2 or the mobile terminal 3 with respect to the private cloud 17 and the service providing system 22, and transfers the service request to the service providing system 22.

When having received the service request to provide a service, from the user terminal 2 or the mobile terminal 3 through the network 4, the communication service providing system 10 authenticates whether the user of the user terminal 2 or the mobile terminal 3 serving as the transmission source of the service request is a legitimate user. For example, the communication service providing system 10 performs authentication of a user, using a Security Assertion Markup Language (SAML). In addition, when the user of the user terminal 2 or the mobile terminal 3 has been authenticated as the legitimate user, the communication service providing system 10 establishes a session with the user terminal 2 or the mobile terminal 3.

In addition, the communication service providing system 10 performs proxy authentication of the user terminal 2 or the mobile terminal 3 serving as the transmission source of the service request, with respect to the private cloud 17 and the service providing system 22. For example, the communication service providing system 10 performs the login of the user of the user terminal 2 or the mobile terminal 3 serving as the transmission source of the service request.

Next, the communication service providing system 10 performs Application Program Interface (API) authorization due to OAuth, among the communication service providing system 10, the private cloud 17, and the service providing system 22. In addition, the communication service providing system 10 transfers the service request received from the user terminal 2 or the mobile terminal 3, to the service providing system 22.

In addition, the private cloud 17 manages the data the user of the user terminal 2 has deposited, and when having received, from the service providing system 22, a request to acquire the data, the private cloud 17 makes an inquiry to the communication service providing system 10 about whether to transmit the data. On the other hand, when having received the service request, the service providing system 22 acquires, from the private cloud 17, the data the user has deposited, analyzes the acquired data, and transmits an analysis result to the user terminal 2 or the mobile terminal 3 serving as the transmission source of the service request.

Here, the data the private cloud 17 manages includes a portion which it is undesirable that the service providing system 22 deciphers, such as the privacy information or the confidential information. Therefore, when API authorization due to the OAuth is performed, the communication service providing system 10 notifies the private cloud 17 of a session ID indicating a session established with the user terminal 2 or the mobile terminal 3, as an encryption key.

For example, when having received the service request from the user terminal 2, the communication service providing system 10 establishes a session with the user terminal 2. In addition, the communication service providing system 10 transfers the service request to the service providing system 22. In such a case, the service providing system 22 requests data to be an analysis target, from the private cloud 17. In addition, the private cloud 17 makes an inquiry to the communication service providing system 10 about whether to transmit the data.

In response to this, along with whether to transmit the data, the communication service providing system 10 notifies the service providing system 22 of the session ID of the session established with the user terminal 2 or the mobile terminal 3, as an encryption key used for encrypting a range which it is desirable to mask. In addition, when having received the session ID from the communication service providing system 10, the private cloud 17 encrypts the range to be masked, using the received session ID, from among the data requested by the service providing system 22. After that, the private cloud 17 transmits, to the service providing system 22, data where the range to be masked is encrypted.

Figure 5:
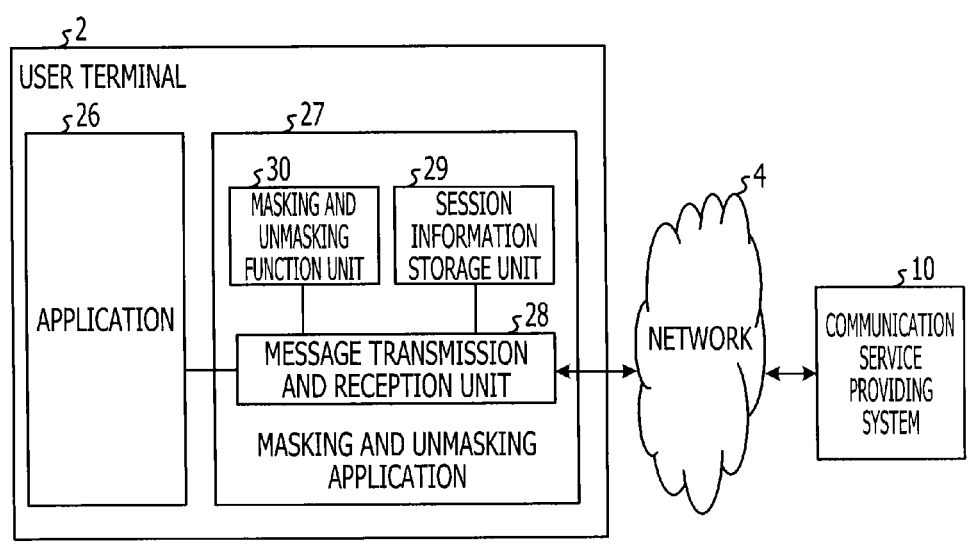
FIG. 5 is a diagram for explaining a functional configuration of a user terminal according to the first embodiment.

Next, using FIG. 5, the user terminal 2 will be described. FIG. 5 is a diagram for explaining the functional configuration of a user terminal according to the first embodiment. In addition, it is assumed that the mobile terminal 3 fulfills the same function as the user terminal 2 illustrated in FIG. 5, and the description thereof will be omitted.

As illustrated in FIG. 5, the user terminal 2 causes an application 26 and a masking and unmasking application 27 to operate. In addition, the masking and unmasking application 27 includes a message transmission and reception unit 28, a session information storage unit 29, and a masking and unmasking function unit 30.

The application 26 is an application program causing the user terminal 2 to fulfill various kinds of functions. In addition, when requesting the service providing system 22 to provide a service, the application 26 transmits a service request to the communication service providing system 10 through the message transmission and reception unit 28.

In addition, the application 26 transmits and receives various kinds of messages to and from the communication service providing system 10 through the message transmission and reception unit 28. For example, when having received an authentication request from the communication service providing system 10, the application 26 performs transmission and reception of a message associated with authentication processing and an authentication assertion through the message transmission and reception unit 28. In addition, when having acquired an analysis result due to the service providing system 22 through the message transmission and reception unit 28, the application 26 performs display of the acquired analysis result or the like.

When having received, from the application 26, the service request, the message associated with the authentication processing, and the authentication assertion, the message transmission and reception unit 28 transmits the received message and the authentication assertion to the communication service providing system 10 through the network 4. In addition, when having received the authentication request and the message associated with the authentication processing, from the communication service providing system 10 through the network 4, the message transmission and reception unit 28 outputs the authentication request and the message, which have been received, to the application 26.

Here, when having received the notification of the session ID from the communication service providing system 10, the message transmission and reception unit 28 stores the received session ID in the session information storage unit 29. In addition, the message transmission and reception unit 28 adds the session ID, stored in the session information storage unit 29, to a message such as the service request or a logout request, which is to be transmitted from the application 26 to the communication service providing system 10, and transmits the message.

In other words, when no session with the communication service providing system 10 is established, the message transmission and reception unit 28 transmits, to the communication service providing system 10, the service request to which no session ID is added. After that, when a session has been established after the application 26 has executed authentication processing with the communication service providing system 10, the message transmission and reception unit 28 transmits, to the communication service providing system 10, the service request to which the session ID indicating the established session is added.

In addition, the message transmission and reception unit 28 adds the session ID to the service request, using an arbitrary method. For example, the message transmission and reception unit 28 may also cause the session ID to be included in a Cookie of a Hyper Text Transfer Protocol (HTTP) included in the header of the service request and transmit the session ID.

In addition, when having received the analysis result due to the service providing system 22 from the communication service providing system 10, the message transmission and reception unit 28 delivers the received analysis result to the masking and unmasking function unit 30. In response to this, the masking and unmasking function unit 30 utilizes, as a decryption key, the session ID stored in the session information storage unit 29 and decrypts the analysis result.

For example, the masking and unmasking function unit 30 decrypts the masked range from among the analysis result with defining the session ID as an initial vector. In addition, the masking and unmasking function unit 30 outputs a decryption result to the message transmission and reception unit 28. After that, the message transmission and reception unit 28 outputs, to the application 26, the analysis result the masking and unmasking function unit 30 has decrypted.

Returning to FIG. 4, when having received the service request from the user terminal 2 or the mobile terminal 3, the communication service providing system 10 establishes a session with the user terminal 2 or the mobile terminal 3, and performs authentication of the private cloud 17 and the service providing system 22. In addition, the communication service providing system 10 transfers the service request to the service providing system 22.

In addition, when having received, from the private cloud 17, an inquiry about whether data may be transmitted to the service providing system 22, the communication service providing system 10 executes the following processing. In other words, along with a notification to the effect that the data is permitted to be transmitted, the communication service providing system 10 transmits the session ID indicating the session established with the user terminal 2 or the mobile terminal 3, as an encryption key for encrypting the masked range of data. In addition, when having received the analysis result from the service providing system 22, the communication service providing system 10 transmits the received analysis result to the user terminal 2 or the mobile terminal 3 serving as the transmission source of the service request, through the network 4.

Hereinafter, the authentication server 11, the ID management server 12, and the gateway server 14 the communication service providing system 10 includes will be described. In addition, it is assumed that the gateway servers 15 and 16 fulfill the same function as the gateway server 14, and the description thereof will be omitted.

The authentication server 11 is a server performing authentication of the user terminal 2 and the mobile terminal 3 that transmit service requests to the communication service providing system 10. For example, the authentication server 11 stores therein an ID and a password, preliminarily assigned to the user of the user terminal 2, with associating the ID and the password with each other. In addition, when the authentication server 11 has stored therein an ID and a password, received from the user terminal 2, with associating the ID and the password with each other, the authentication server 11 stores therein the effect that the user terminal 2 has logged in.

The ID management server 12 manages an ID and a password used for authentication performed when the user terminal 2 or the mobile terminal 3 receives a service the private cloud 17 and the service providing system 22 provide. For example, the ID management server 12 manages an ID and a password used for authentication due to the private cloud 17. In addition, when the gateway server 14 is subjected to the authentication due to the private cloud 17, the ID management server 12 notifies the gateway server 14 of an ID and a password used for being subjected to the authentication due to the private cloud 17.

Figure 6:
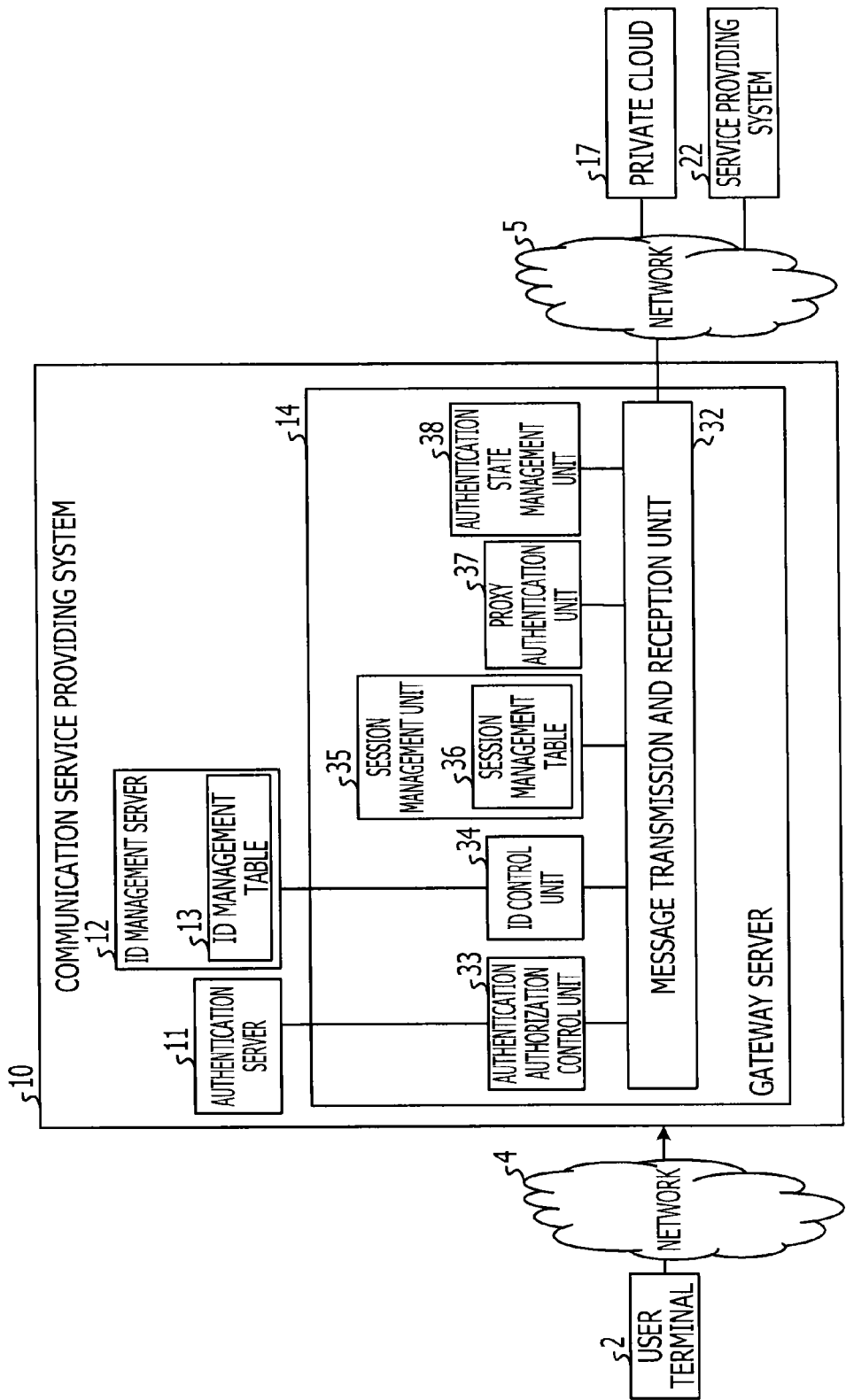
FIG. 6 is a diagram for explaining a functional configuration of a gateway server according to the first embodiment.

Next, using FIG. 6, the functional configuration of the gateway server 14 will be described. FIG. 6 is a diagram for explaining the functional configuration of a gateway server according to the first embodiment. As illustrated in FIG. 6, the gateway server 14 includes a message transmission and reception unit 32, an authentication authorization control unit 33, an ID control unit 34, a session management unit 35, a proxy authentication unit 37, and an authentication state management unit 38. In addition, the session management unit 35 stores therein a session management table 36. In addition, the authentication authorization control unit 33 couples to the authentication server 11. In addition, the ID control unit 34 couples to the ID management server 12.

In addition, in the following description, after the ID management table 13 and the session management table 36 are described, processing operations will be described that are executed by the message transmission and reception unit 32, the authentication authorization control unit 33, the ID control unit 34, the session management unit 35, the proxy authentication unit 37, and the authentication state management unit 38. First, using FIG. 7, the ID management table 13 the ID management server 12 includes will be described.

FIG. 7 is a diagram for explaining an example of an ID management table according to the first embodiment. As illustrated in FIG. 7, the ID management table 13 includes a plurality of entries where tenant IDs, user IDs, service Uniform Resource Locators (URLs), IDs, and passwords are associated with one another. Here, the tenant ID is information indicating an organization such as a company, and indicates an organization to which a user indicated by a user ID associated therewith belongs.

In addition, the user ID is information indicating a user. In addition, the service URL is information indicating a server providing a service to a user indicated by a user ID associated therewith, and, for example, is the URL of a server serving as the transmission destination of a service request. In addition, the ID is an ID used when a user indicated by a user ID associated therewith logs in a service URL associated therewith. In addition, the password is a password used when a user indicated by a user ID associated therewith logs in a service URL associated therewith.

For example, in the example illustrated in FIG. 7, the ID management table 13 indicates the effect that a "User001" belonging to a tenant ID "tenantA" logs in a URL "https:service1.com" with an ID "S1yyyy" and a password "PWyyyy". In addition, the ID management table 13 indicates the effect that a "User002" belonging to a tenant ID "tenantB" logs in a URL "https:service2.com" with an ID "S2zzzz" and a password "PWzzzz".

In addition, in the following description, it is assumed that the URL "https:service1.com" indicates the URL of the service providing system 22 and the URL "https:service2.com" indicates the URL of the private cloud 17.

Next, using FIG. 8, the session management table 36 the session management unit 35 includes will be described. FIG. 8 is a diagram for explaining an example of a session management table a gateway server includes. In the example illustrated in FIG. 8, the session management table 36 includes entries where session IDs, tenant IDs, user IDs, collaboration source service URLs, collaboration source session IDs, collaboration destination service URLs, and collaboration destination session IDs are associated with one another.

Here, the session ID is information indicating a session established with the user terminal 2 serving as the transmission source of a service request. In addition, the collaboration source service URL is information indicating a server providing a collaboration source service. Here, the collaboration source service is a service provided using acquired data where the data is acquired from another service, for example, a service the service providing system 22 provides. In addition, the collaboration source session ID is a session ID indicating a session established between the gateway server 14 and the server providing the collaboration source service.

In addition, the collaboration destination service URL is a service transmitting data to the collaboration source service, and for example, a service the private cloud 17 provides. In addition, the collaboration destination session ID is a session ID indicating a session established between the gateway server 14 and the server providing the collaboration destination service.

For example, in the example illustrated in FIG. 8, the session management table 36 indicates the effect that when a service request has been received from the user terminal 2 the "User001" belonging to the "tenantA" indicates, a session a session ID "abcd0231" indicates has been established with the user terminal 2. In addition, the session management table 36 indicates the effect that when the session the session ID "abcd0231" indicates has been established with the user terminal 2, a session "yyyyyy" has been established with the "https://service1.com". In addition, the session management table 36 indicates the effect that when the session "abcd0231"

has been established, a session "zzzzzzz" has been established with the "https://service2.com".

Returning to FIG. 6, the message transmission and reception unit 32 refers to the headers or the like of messages received from the user terminal 2, the authentication authorization control unit 33, the ID control unit 34, the session management unit 35, the proxy authentication unit 37, and the authentication state management unit 38, and identifies the types of the received messages. In addition, the message transmission and reception unit 32 outputs the messages to output destinations corresponding to the types of the received messages.

For example, when a message received from the user terminal 2 is a service request, the message transmission and reception unit 32 outputs the service request to the ID control unit 34. In addition, when a received message is a logout request from the gateway server 14, the message transmission and reception unit 32 outputs the logout request to the authentication authorization control unit 33.

In addition, when a message received from the user terminal 2 is a message in authentication processing, the message transmission and reception unit 32 outputs the received message to the authentication authorization control unit 33. In addition, when having received, from the authentication authorization control unit 33, a message according to authentication processing, which is addressed to the user terminal 2, the message transmission and reception unit 32 transmits the received message to the user terminal 2.

In addition, when having received an authentication assertion from the user terminal 2, the message transmission and reception unit 32 outputs the authentication assertion to the session management unit 35. In addition, the message transmission and reception unit 32 relays messages and pieces of data the authentication authorization control unit 33, the ID control unit 34, the session management unit 35, the proxy authentication unit 37, and the authentication state management unit 38 transmit and receive to and from one another.

The authentication authorization control unit 33 performs pre-authentication for the user of the user terminal 2. For example, when having received a message according to authentication processing from the user terminal 2, the authentication authorization control unit 33 make an inquiry to the authentication server 11, and determines whether the user terminal 2 is in a login state. In addition, in another example, when there is not session information in cookie information of HTTP, the authentication authorization control unit 33 determines that the user terminal 2 is not in a login state.

In addition, when having acquired, from the authentication server 11, a notification to the effect that the user terminal 2 is not in a login state, the authentication authorization control unit 33 requests login processing from the user terminal 2. In such a case, in coordination with the authentication server 11, the user terminal 2 performs processing for giving notice of a user ID and a password and the like, and logs in.

Here, when the user terminal 2 is in a login state or when the user terminal 2 has logged in, the authentication server 11 notifies the authentication authorization control unit 33 of the effect that the user terminal 2 has logged in. In response to this, the authentication authorization control unit 33 notifies the session management unit 35 of the effect that the user terminal 2 has been already authenticated.

In addition, when having received a logout request from the user terminal 2, the authentication authorization control unit 33 notifies the authentication server 11 of the effect that the user terminal 2 has logged out. In such a case, the authentication server 11 performs the logout of the user terminal 2. In addition, as for the login and logout of the user terminal 2, the authentication server 11 may utilize, for example, an authentication system such as an OpenID.

The ID control unit 34 makes an inquiry about a user ID and a password used by the user terminal 2 to log in a service providing source. For example, when having received a service request, the ID control unit 34 determines whether a session ID has been added to the received service request. In addition, when no session ID has been added to the service request, the ID control unit 34 determines that the user terminal 2 has not logged in, and transmits an authentication request to the user terminal 2.

In addition, when the session ID has been added to the service request, the ID control unit 34 extracts the added session ID. In addition, through the message transmission and reception unit 32, the ID control unit 34 makes an inquiry to the session management unit 35 about whether an entry including the extracted session ID has been stored in the session management table 36. In addition, when having received, from the session management unit 35, the effect that the entry has been stored in the session management table 36, the ID control unit 34 transfers the service request to the proxy authentication unit 37 through the message transmission and reception unit 32.

On the other hand, when having received the effect that the entry has not been stored in the session management table 36, the ID control unit 34 executes processing for adding a new entry to the session management table 36. In detail, the ID control unit 34 extracts a tenant ID, a user ID, and a collaboration source service URL from the service request.

In addition, the ID control unit 34 transmits the session ID, the tenant ID, the user ID, and the collaboration source service URL, extracted from the service request, to the session management unit 35. In response to this, the session management unit 35 adds, to the session management table 36, a new entry where the session ID, the tenant ID, the user ID, and the collaboration source service URL, which have been received, are associated with one another. After that, the ID control unit 34 transmits the service request to the proxy authentication unit 37.

In addition, when having received, from the proxy authentication unit 37, the inquiry about an ID and a password along with the tenant ID, the user ID, and the collaboration destination service URL, the ID control unit 34 executes the following processing. In other words, the ID control unit 34 acquires, from the ID management table 13 in the ID management server 12, the ID and the password, associated with the tenant ID, the user ID, and the collaboration destination service URL, which have been received. In addition, the ID control unit 34 transmits the acquired ID and password to the proxy authentication unit 37.

In addition, when having received, from the proxy authentication unit 37, the inquiry about the ID and the password along with the tenant ID, the user ID, and the collaboration destination service URL, the ID control unit 34 also acquires the ID and the password from the ID management table 13. In addition, the ID control unit 34 transmits the acquired ID and password to the proxy authentication unit 37.

In addition, when the tenant ID, the user ID, and the collaboration destination service URL received along with the inquiry about the ID and the password have not been stored in the ID management table 13, the ID control unit 34 requests the user terminal 2 to input the ID and the password. In detail, the ID control unit 34 transmits a request to input the ID and the password, to the user terminal 2 indicated by the tenant ID and the user ID received along with the inquiry.

In addition, when having received the ID and the password from the user terminal 2, the ID control unit 34 transmits the received ID and password to the proxy authentication unit 37. In addition, the ID control unit 34 adds, to the ID management table 13, a new entry where the tenant ID, the user ID, and the collaboration destination service URL, received along with the inquiry, and the ID and the password, received from the user, are associated with one another.

The session management unit 35 establishes a session with the user terminal 2, and transmits a session ID indicating the established session, to the user terminal 2. For example, when having received, from the authentication authorization control unit 33, a notification to the effect that the user terminal 2 has been already authenticated and having received an authentication assertion from the user terminal 2, the session management unit 35 generates a session ID, and transmits the generated session ID to the user terminal 2.

In addition, when having received, from the ID control unit 34, an inquiry about whether the session ID has been stored in the session management table 36, the session management unit 35 searches for an entry including the session ID serving as the target of the inquiry, within the session management table 36. In addition, as the result of the search, the session management unit 35 notifies the ID control unit 34 of whether the session ID serving as the target of the inquiry has been stored.

In addition, when having received the session ID, the tenant ID, the user ID, and the collaboration source service URL from the ID control unit 34, the session management unit 35 adds a new entry to the session management table 36. In other words, the session management unit 35 adds, to the session management table 36, the new entry where the session ID, the tenant ID, the user ID, and the collaboration source service URL, which have been received, are associated with one another.

In addition, when, from the proxy authentication unit 37, having received the collaboration source session ID, the collaboration destination service URL, and the collaboration destination session ID along with the session ID, the session management unit 35 searches for an entry including the received session ID, within the session management table 36. In addition, to the entry searched for, the session management unit 35 adds the collaboration source session ID, the collaboration destination service URL, and the collaboration destination session ID, which have been received.

In addition, using an arbitrary method, the session management unit 35 transmits the session ID to the user terminal 2. For example, the session management unit 35 transmits, as a portion of a Cookie, the session ID to the user terminal 2.

When having received the service request the user terminal 2 has transmitted, the proxy authentication unit 37 performs authentication with respect to the collaboration source service and the collaboration destination service, on behalf of the user terminal 2. For example, when having received the service request, the proxy authentication unit 37 extracts the session ID from the received service request, and searches for an entry including the extracted session ID, within the session management table 36 in the session management unit 35.

In addition, the proxy authentication unit 37 determines whether the collaboration source session ID, the collaboration destination service URL, and the collaboration destination session ID have been stored in the entry searched for, and executes proxy authentication processing when the collaboration source session ID, the collaboration destination service URL, and the collaboration destination session ID have not been stored. Hereinafter, the proxy authentication processing the proxy authentication unit 37 executes will be described.

First, the proxy authentication unit 37 extracts a tenant ID, a user ID, and a collaboration source service URL from a service request, and transmits, to the ID control unit 34, an inquiry about an ID and a password, along with the tenant ID, the user ID, and the collaboration source service URL, which have been extracted. In addition, when having received the ID and the password from the ID control unit 34, the proxy authentication unit 37 transmits the service request to the collaboration source service URL, and performs authentication with respect to a collaboration source service, using the received ID and password.

In addition, the proxy authentication unit 37 acquires a collaboration destination service URL from the collaboration source service, and transmits, to the ID control unit 3, an inquiry about an ID and a password along with the tenant ID and the user ID, extracted from the service request, and the acquired collaboration destination service URL. In addition, when having received the ID and the password from the ID control unit 34, the proxy authentication unit 37 transmits the service request to the collaboration destination service URL, and performs authentication with respect to the collaboration destination service, using the received ID and password.

Here, when having performed authentication with the collaboration destination service such as the private cloud 17, the proxy authentication unit 37 receives, from the collaboration destination service, the response of an access permission screen used for confirming whether the access of the collaboration source service is permitted and data is allowed to be transmitted. In response to this, using a method such as confirming with the user, the proxy authentication unit 37 determines whether the access is to be permitted, and transmits access permission to the authentication state management unit 38 when it has been determined that the access is to be permitted.

In addition, the proxy authentication unit 37 searches for an entry associated with the session ID included in the service request, within the session management table 36, and complements the entry searched for. In other words, the proxy authentication unit 37 adds, to the entry searched for, the collaboration destination service URL, the collaboration source session ID indicating the session established when the authentication with respect to the collaboration source service has been performed, and the collaboration destination session ID indicating the session established when the authentication with respect to the collaboration destination service has been performed.

In addition, when the collaboration source session ID, the collaboration destination service URL, and the collaboration destination session ID have been stored in the entry searched for, the proxy authentication unit 37 transmits the service request to the collaboration source service URL. In other words, when the authentication with respect to the collaboration source service and the collaboration destination service has finished, the proxy authentication unit 37 transmits the service request to the collaboration source service URL without performing the proxy authentication processing.

When the proxy authentication unit 37 has performed authentication with respect to the collaboration destination service, the authentication state management unit 38 transmits, as an encryption key for masking data, the session ID indicating the session established with the user, to the collaboration destination service. Hereinafter, using FIG. 9, processing the authentication state management unit 38 executes will be described.

Figure 9:
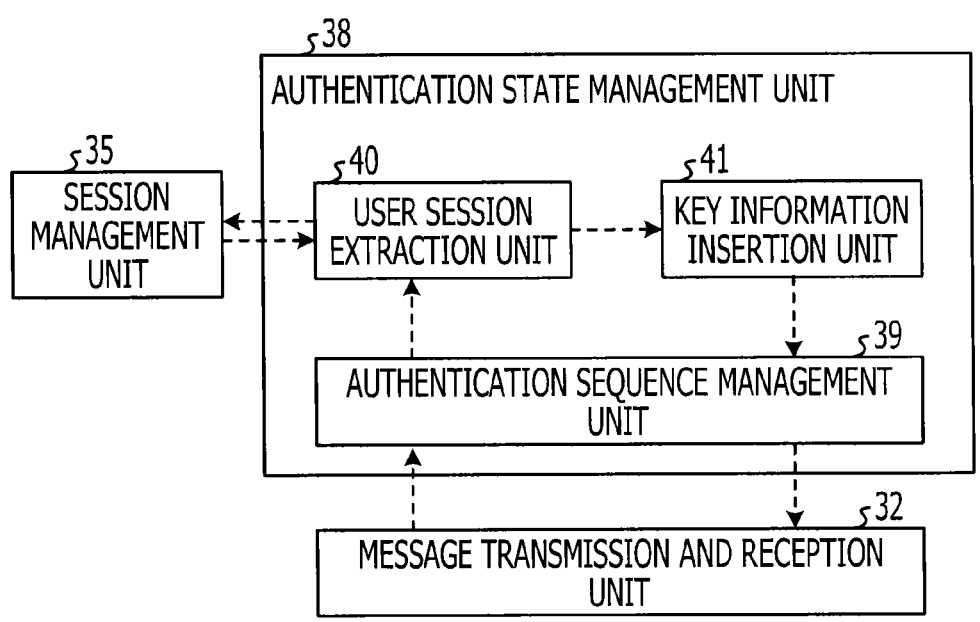
FIG. 9 is a diagram for explaining a functional configuration of an authentication state management unit.

FIG. 9 is a diagram for explaining the functional configuration of an authentication state management unit. As illustrated in FIG. 9, the authentication state management unit 38 includes an authentication sequence management unit 39, a user session extraction unit 40, and a key information insertion unit 41. Hereinafter, processing operations will be described that are executed by the authentication sequence management unit 39, the user session extraction unit 40, and the key information insertion unit 41.

Using messages the message transmission and reception unit 32 transmits and receives, the authentication sequence management unit 39 monitors proxy authentication processing the proxy authentication unit 37 performs. For example, when the proxy authentication unit 37 has executed the proxy authentication processing, the authentication sequence management unit 39 identifies the tenant ID, the user ID, the collaboration source service URL, the collaboration destination service URL, and the like of a user from the messages the message transmission and reception unit 32 transmits and receives.

In addition, when having received access permission the proxy authentication unit 37 has output, the authentication sequence management unit 39 outputs the received access permission to the user session extraction unit 40. In addition, the authentication sequence management unit 39 notifies the user session extraction unit 40 of the tenant ID, the user ID, the collaboration source service URL, the collaboration destination service URL, and the like, which have been identified.

When having received the tenant ID, the user ID, the collaboration source service URL, the collaboration destination service URL, and the like, the user session extraction unit 40 executes the following processing. In other words, using the tenant ID, the user ID, the collaboration source service URL, the collaboration destination service URL, and the like, which have been received, the user session extraction unit 40 extracts a session ID from the session management table 36 the session management unit 35 includes, as illustrated in F in FIG. 8.

For example, when the proxy authentication processing has been performed owing to the service request received from the user terminal 2, the user session extraction unit 40 extracts a session ID indicating a session established between the user terminal 2 and the communication service providing system 10. In addition, the user session extraction unit 40 outputs the extracted session ID and the received access permission to the key information insertion unit 41.

When having received the access permission and the session ID from the user session extraction unit 40, the key information insertion unit 41 inserts the received session ID into the access permission, as an encryption key used for encrypting data the collaboration destination service masks. In addition, the key information insertion unit 41 outputs, to the authentication sequence management unit 39, the access permission into which the encryption key has been inserted. In response to this, the authentication sequence management unit 39 transmits the access permission received from the key information insertion unit 41, to the collaboration destination service such as the private cloud 17 through the message transmission and reception unit 32.

As described above, with respect to the private cloud 17 and the service providing system 22, the gateway server 14 performs the authentication processing utilizing the OAuth. Here, in the authentication processing utilizing the OAuth, a confirmation phase is included where the collaboration destination service requests permission of whether data is to be transmitted to the collaboration source service. Therefore, the gateway server 14 causes an encryption key used for encrypting data to be included in access permission permitting the collaboration destination service to transmit data in the confirmation phase, and transmits the access permission to the collaboration destination service.

For example, when having received a service request from the user terminal 2, the gateway server 14 establishes a session with the user terminal 2. In addition, using the OAuth, the gateway server 14 performs authentication of the private cloud 17 and the service providing system 22. In addition, when having received, from the private cloud 17, an inquiry about whether transmission of data to the service providing system 22 is to be permitted, the gateway server 14 inserts, into the access permission, the session ID indicating the session established with the user terminal 2, as the encryption key. In addition, the gateway server 14 transmits, to the private cloud 17, the access permission into which the encryption key has been inserted.

In response to this, the private cloud 17 extracts the session ID inserted into the access permission, and defines the extracted session ID as an encryption key used for encrypting a range to be masked from among data to be transmitted to the service providing system 22. For example, the private cloud 17 defines the extracted session ID as an initial vector, and encrypts the range to be masked from among the data to be transmitted to the service providing system 22.

In other words, the gateway server 14 defines the session ID established with the user terminal 2, as the encryption key, and when the private cloud 17 has requested access permission at the time of transmitting the data to the service providing system 22, the gateway server 14 transmits the encryption key along with the access permission. Therefore, the gateway server 14 easily accepts or delivers the encryption key.

Figure 10:
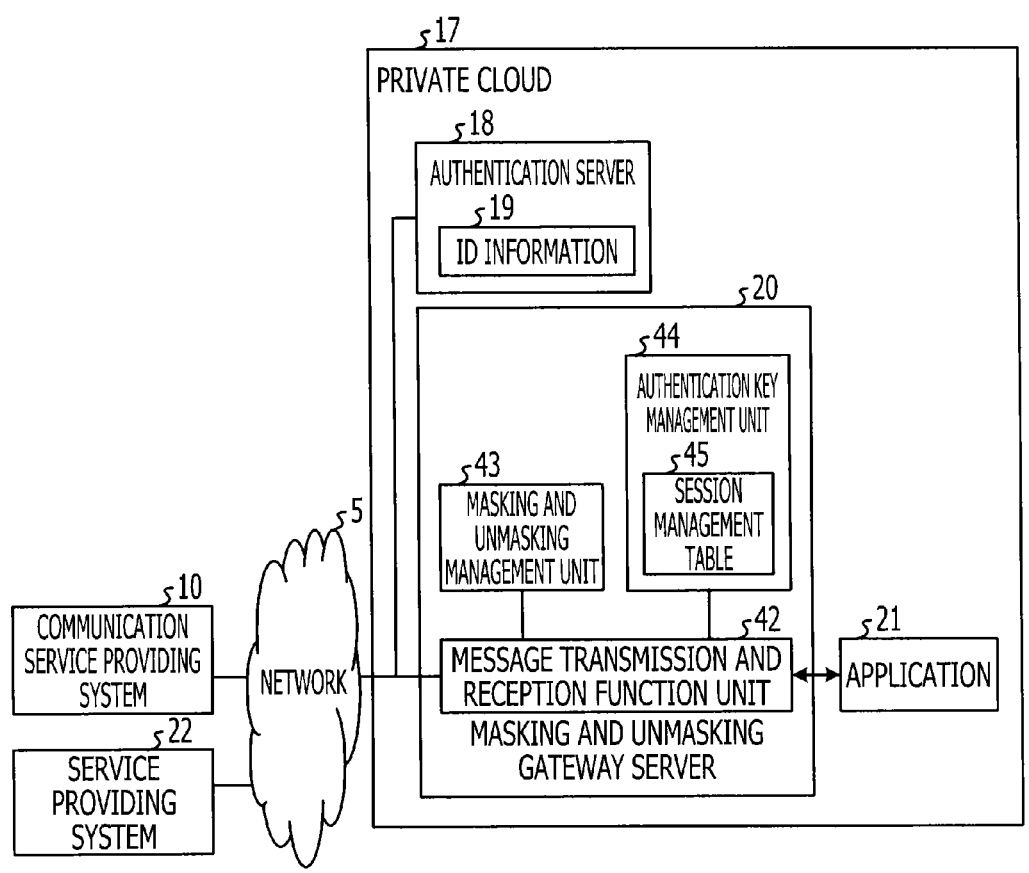
FIG. 10 is a diagram for explaining a functional configuration of a private cloud.

Next, using FIG. 10, the functional configuration of the private cloud 17 will be described. FIG. 10 is a diagram for explaining the functional configuration of a private cloud. In the example illustrated in FIG. 10, the private cloud 17 includes an authentication server 18 and a masking and unmasking gateway server 20, and causes the application 21 to operate.

In addition, the authentication server 18 stores therein the ID information 19 where the ID and the password of a user utilizing a service the private cloud 17 provides are associated with each other. In addition, the masking and unmasking gateway server 20 includes a message transmission and reception function unit 42, a masking and unmasking management unit 43, and an authentication key management unit 44. In addition, the authentication key management unit 44 includes a session management table 45.

Figure 11:
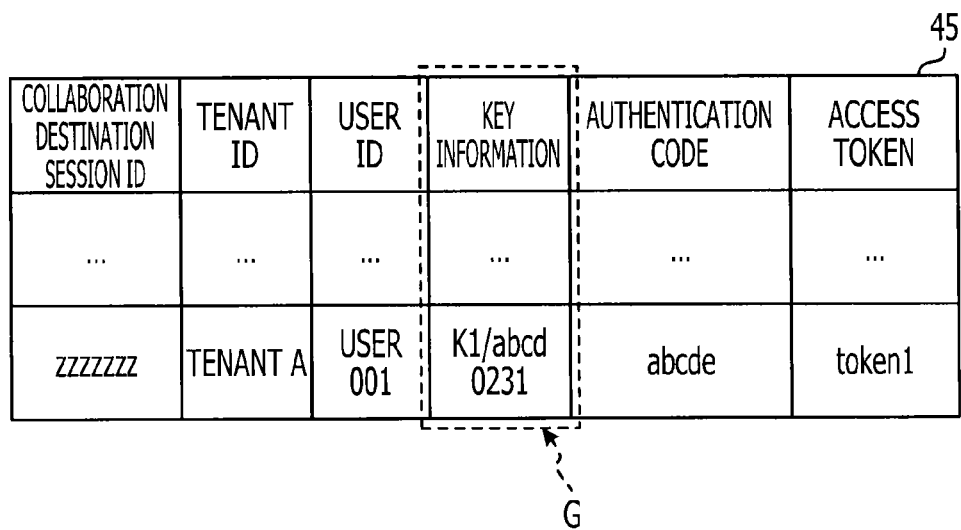
FIG. 11 is a diagram for explaining an example of a session management table a masking and unmasking gateway server includes.

First, using FIG. 11, the session management table 45 the authentication key management unit 44 includes will be described. FIG. 11 is a diagram for explaining a session management table a masking and unmasking gateway server includes. As illustrated in FIG. 11, the session management table 45 includes an entry where a collaboration destination session ID, a tenant ID, a user ID, key information, an authentication code, and an access token are associated with one another.

Here, the key information is the information of an encryption key used for encrypting a range to be masked with respect to the service providing system 22, from among data to be transmitted to the service providing system 22. In addition, in OAuth authentication, the authentication code is information included in a permission completion notification to be transmitted after the private cloud 17 receives access permission from the communication service providing system 10.

In addition, in response to whether an authentication code included in the session management table 45 coincides with an authentication code included in an access token request received from the service providing system 22, the private cloud 17 issues an access token. In addition, the access token is information used for identifying a data request from the service providing system 22, and information to be notified to the service providing system 22 when an access token request including an associated authentication code has been received from the service providing system 22.

In the example illustrated in FIG. 11, the session management table 45 indicates the effect that the session of the collaboration destination session ID "zzzzzzz" has been established with the communication service providing system 10 owing to the service request of the user terminal 2 specified by the "tenantA" and the "User001". In addition, the session management table 45 indicates the effect that an authentication code "abcde" has been transmitted to the communication service providing system 10 in the session of the collaboration destination session ID "zzzzzzz".

In addition, the session management table 45 indicates the effect that when an access token request including the authentication code "abcde" has been received from the service providing system 22, an access token "token1" has been transmitted to the service providing system 22. In addition, the session management table 45 indicates the effect that the masked range of data to be transmitted when a data request including the access token "token1" has been received is encrypted using a common key "K1" and an initial vector "abcd0231".

Returning to FIG. 10, the authentication server 18 performs authentication of a user utilizing a service the private cloud 17 provides. For example, when the private cloud 17 has received an authentication request from the communication service providing system 10, the authentication server 18 transmits a response, and receives an ID and a password from the communication service providing system 10.

In addition, when a pair of the ID and the password received from the communication service providing system 10 is included in the ID information 19, the authentication server 18 transmits an access permission screen response as an inquiry about whether to transmit data to the service providing system 22. In addition, when having received an access token request according to the OAuth authentication from the service providing system 22, the authentication server 18 transmits an access token response to the service providing system 22. In addition, the authentication server 18 transmits the notification of an access token to the application 21.

When having received a data request including an access token from the service providing system 22, the application 21 confirms whether the access token coincides with the access token received from the authentication server 18. In addition, when the access tokens have coincided with each other, the application 21 transmits a data response to the service providing system 22 through the masking and unmasking gateway server 20. In addition, while being omitted in FIG. 10, the application 21 also includes other functions provided so that the private cloud 17 provides a storage service for data.

The message transmission and reception function unit 42 transmits and receives messages. For example, when having received a message according to the OAuth authentication, the message transmission and reception function unit 42 transmits the received message to the application 21. In addition, when having received a data response from the application 21, the message transmission and reception function unit 42 outputs the received data response to the masking and unmasking management unit 43. In addition, the message transmission and reception function unit 42 transmits the data response the masking and unmasking management unit 43 outputs, to the service providing system 22 through the network 5.

In addition, when having received, as a response corresponding to the access permission screen response the authentication server 18 has transmitted, access permission from the communication service providing system 10 through the network 5, the message transmission and reception function unit 42 executes the following processing. First, the message transmission and reception function unit 42 extracts a collaboration destination session ID, a tenant ID, and a user ID from a message the authentication server 18 transmits or receives to or from the communication service providing system 10. In addition, the message transmission and reception function unit 42 extracts a session ID included in access permission.

In addition, by outputting the collaboration destination session ID, the tenant ID, the user ID, and the session ID, which have been extracted, to the authentication key management unit 44, the message transmission and reception function unit 42 adds a new entry to the session management table 45. In such a case, as illustrated in G in FIG. 11, the authentication key management unit 44 stores, in the session management table 45, the new entry where the session ID is defined as key information.

In addition, the message transmission and reception function unit 42 extracts an authentication code and an access token from a message the application 21 transmits or receives to or from the service providing system 22, and outputs the authentication code and the access token to the authentication key management unit 44. In response to this, the authentication key management unit 44 adds the authentication code and the access token to an entry. Accordingly, the authentication code and the access token are associated with each other.

When having received a data response from the message transmission and reception function unit 42, the masking and unmasking management unit 43 extracts data included in the data response, namely, data to be the target of an analysis service of the service providing system 22. In addition, the masking and unmasking management unit 43 identifies a range to be masked with respect to the service providing system 22, from among the extracted data.

For example, the masking and unmasking management unit 43 receives a data response including data to be transmitted to the service providing system 22, the data response being requested owing to the access token. In response to this, the masking and unmasking management unit 43 identifies confidential data, privacy information, and the like, included in the data, from the data response requested owing to the access token.

In addition, through the message transmission and reception function unit 42, the masking and unmasking management unit 43 notifies the authentication key management unit 44 of the extracted access token, and requests an encryption key. In response to this, the authentication key management unit 44 acquires an encryption key associated with the access token given notice of, from the session management table 45, and outputs the acquired encryption key to the masking and unmasking management unit 43.

In addition, using the encryption key received from the message transmission and reception function unit 42, namely, a session ID indicating a session established between the user terminal 2 and the communication service providing system 10, the masking and unmasking management unit 43 encrypts the identified range. After that, through the message transmission and reception function unit 42 and the network 5, the masking and unmasking management unit 43 transmits, to the service providing system 22, data where the range to be masked has been encrypted.

The authentication key management unit 44 manages the session management table 45. For example, when having received a collaboration destination session ID, a tenant ID, a user ID, and key information from the message transmission and reception function unit 42, the authentication key management unit 44 executes the following processing. First, the authentication key management unit 44 prepares to add, to the session management table 45, an entry where the collaboration destination session ID, the tenant ID, the user ID, and the key information, which have been received, are associated with one another.

In addition, when having received an authentication code and an access token from the message transmission and reception function unit 42, the authentication key management unit 44 stores the authentication code and the access token in the prepared entry and adds the entry to the session management table 45.

Returning to FIG. 4, when having received a service request from the communication service providing system 10 through the network 5, the service providing system 22 requests the private cloud 17 to transmit data. In addition, when having received the data from the private cloud 17, the service providing system 22 analyzes the received data, and transmits an analysis result to the communication service providing system 10 through the network 5.

Hereinafter, processing operations will be described that are executed by the authentication server 23 and the application 25, included in the service providing system 22. The authentication server 23 executes the same processing as the authentication server 18, and performs authentication of a user utilizing a service the service providing system 22 provides. In addition, it is assumed that, using the ID information 24, the authentication server 23 executes the same processing as the processing the authentication server 18 executes using the ID information 19, and the description thereof will be omitted.

When having received a service request from the communication service providing system 10 through the network 5, the application 25 performs OAuth authentication with the communication service providing system 10. In addition, when the authentication has been completed, the application 25 transmits a data request to the private cloud 17, as a request to transmit data desirable for execution of the service request. After that, when having received the data from the private cloud 17, the application 25 analyzes the received data. In addition, the application 25 transmits an analysis result to the communication service providing system 10 through the network 5.

Figure 12:
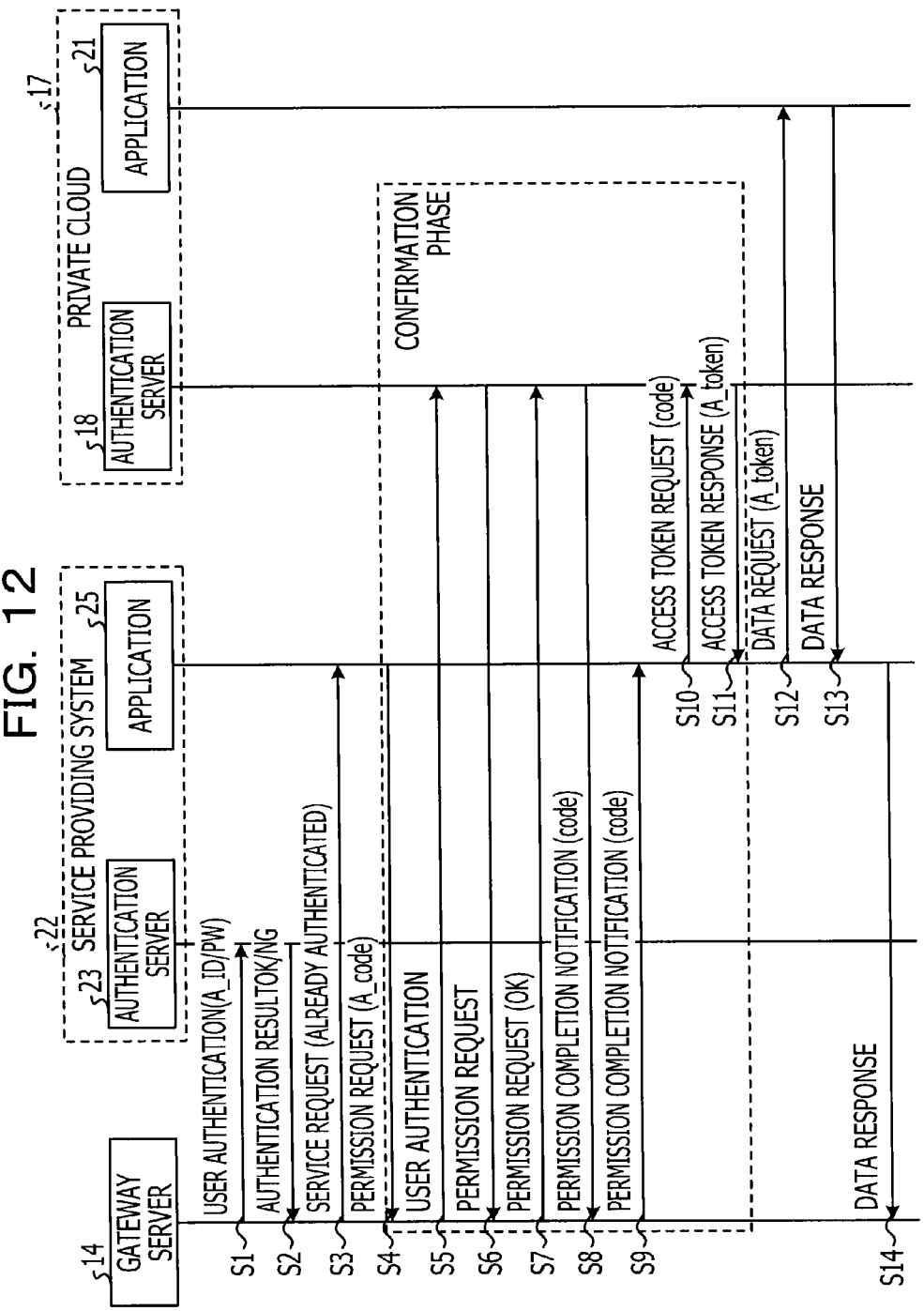
FIG. 12 is a sequence diagram for explaining a confirmation phase of Auth.

Next, using FIG. 12, the flow of processing where the gateway server 14 performs authentication of the service providing system 22 and the private cloud 17 using the OAuth will be described. FIG. 12 is a sequence diagram for explaining a confirmation phase of the OAuth.

For example, the gateway server 14 transmits user authentication including, as an ID, "A_ID" and a password "PW", to the authentication server 23 (step S1). In response to this, the authentication server 23 returns an authentication result of "OK" or "NG" to the gateway server 14 (step S2). Next, when the authentication result is "OK", the gateway server 14 transmits an already authenticated service request to the application 25 (step S3). In response to this, the application 25 transmits a permission request including "A_code" as an authentication code, to the service providing system 22 (step S4).

Next, the gateway server 14 performs user authentication with respect to the authentication server 18 in the private cloud 17 (step S5). In response to this, the authentication server 18 transmits, to the gateway server 14, a permission request for transmitting data to the service providing system 22 (step S6). Therefore, the gateway server 14 transmits, to the authentication server 18, an authentication request including "OK", namely, access permission (step S7).

In response to this, the authentication server 18 transmits, to the gateway server 14, a permission completion notification including an authentication code (step S8). In such a case, the gateway server 14 transmits, to the application 25, a permission completion notification including the authentication code (step S9). In response to this, the application 25 transmits, to the authentication server 18, an access token request including the authentication code (step S10). Therefore, the authentication server 18 transmits, to the application 25, an access token response including an access token "A_token" (step S11).

Next, the application 25 transmits, to the application 21, a data request including the access token "A_token" received owing to the access token response (step S12). In response to this, the application 21 transmits a data response to the application 25 (step S13). After that, the application 25 transmits the data response to the server 14 (step S14).

Here, the gateway server 14 transmits an encryption key to the private cloud 17 in a confirmation phase surrounded by a dotted line, in the OAuth authentication illustrated in FIG. 12 (steps S4 to S11). In other words, when having received, from the private cloud 17, the permission request for data transmission (step S6), the gateway server 14 gives notice of, as an encryption key, a session ID indicating a session established with the user terminal 2 or the mobile terminal 3 (step S7).

Therefore, the gateway server 14 notifies the private cloud 17 of the encryption key without introducing a new communication protocol used for transmitting the encryption key to the private cloud 17.

In addition, the gateway server 14 transmits, as the encryption key, the session ID indicating the session established with the user terminal 2, to the private cloud 17. In addition, the gateway server 14 notifies the user terminal 2 of the session ID as a decryption key. In addition, therefore, the user terminal 2 decrypts an analysis result using the decryption key received from the gateway server 14.

Figure 13:
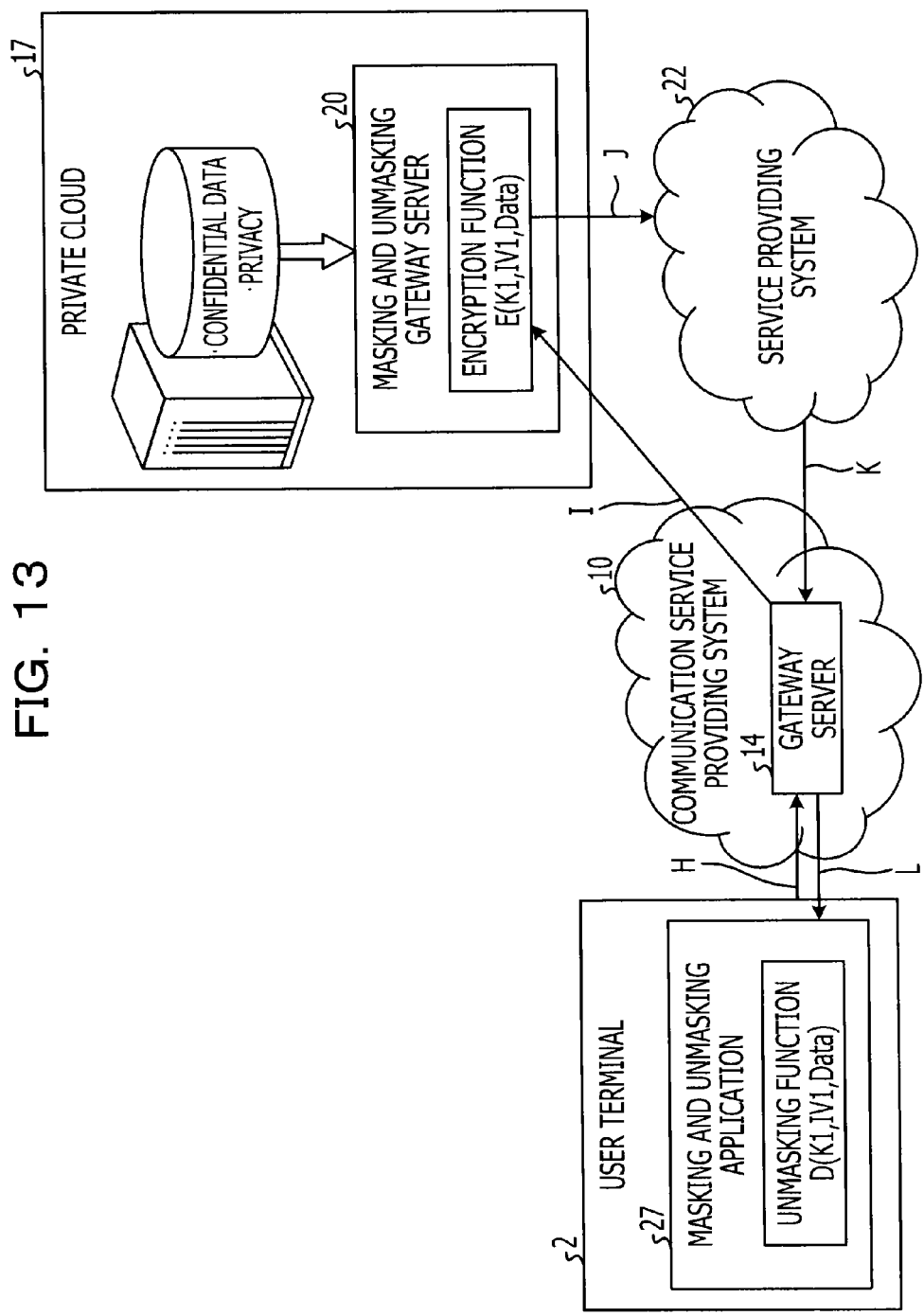
FIG. 13 is a diagram for explaining processing for distributing an encryption key.

Next, using FIG. 13, an example of processing for distributing an encryption key in the communication system 1 will be described. FIG. 13 is a diagram for explaining processing for distributing an encryption key. In addition, in the example illustrated in FIG. 13, it is assumed that the encryption key "K1" of an unmasking function D the masking and unmasking application 27 utilizes and the encryption key "K1" of an encryption function E the masking and unmasking gateway server 20 utilizes coincide with each other. In addition, the encryption key of the unmasking function D and the encryption key of the encryption function E may be replaced owing to download, for example, once in about every six months.

First, as illustrated in H in FIG. 13, the user terminal 2 transmits a service request to the gateway server 14 in the communication service providing system 10. In response to this, the gateway server 14 establishes a session with the user terminal 2, and transmits, as a decryption key, a session ID indicating the established session, to the masking and unmasking application 27 in the user terminal 2. In addition, the masking and unmasking application 27 defines the received decryption key, namely, the session ID, as "IV1" serving as the initial vector (IV) of the unmasking function D.

Next, using the OAuth authentication, the gateway server 14 performs authentication of the private cloud 17 and the service providing system 22. In addition, when having received, from the private cloud 17, a permission request for transmitting data to the service providing system 22, the gateway server 14 determines whether to permit. In addition, when having determined to permit, the gateway server 14 transmits, to the private cloud 17, an access request including the session ID indicating the session established with the user terminal 2, as illustrated in I in FIG. 13.

In addition, when having received the access request from the communication service providing system 10, the masking and unmasking gateway server 20 the private cloud 17 includes extracts the session ID from the received access request. In addition, the masking and unmasking gateway server 20 defines the extracted session ID as "IV1" serving as the initial vector of the encryption function E. In addition, using the encryption function E, the masking and unmasking gateway server 20 encrypts a range to be masked, such as confidential data and privacy information included in data, and transmits the data to the service providing system 22 as illustrated in J in FIG. 13.

The service providing system 22 analyzes the data including the encrypted range, and transmits an analysis result to the gateway server 14 as illustrated in K in FIG. 13. In response to this, as illustrated in L in FIG. 13, the gateway server 14 transmits the analysis result to the masking and unmasking application 27. After that, using the unmasking function D, the masking and unmasking application 27 decrypts the encrypted range included in the analysis result.

Here, both of the initial vector "IV1" of the unmasking function D and the initial vector "IV1" of the encryption function E are the session ID indicating the session established between the user terminal 2 and the communication service providing system 10. Therefore, the masking and unmasking application 27 correctly decrypts the analysis result.

Figure 14:
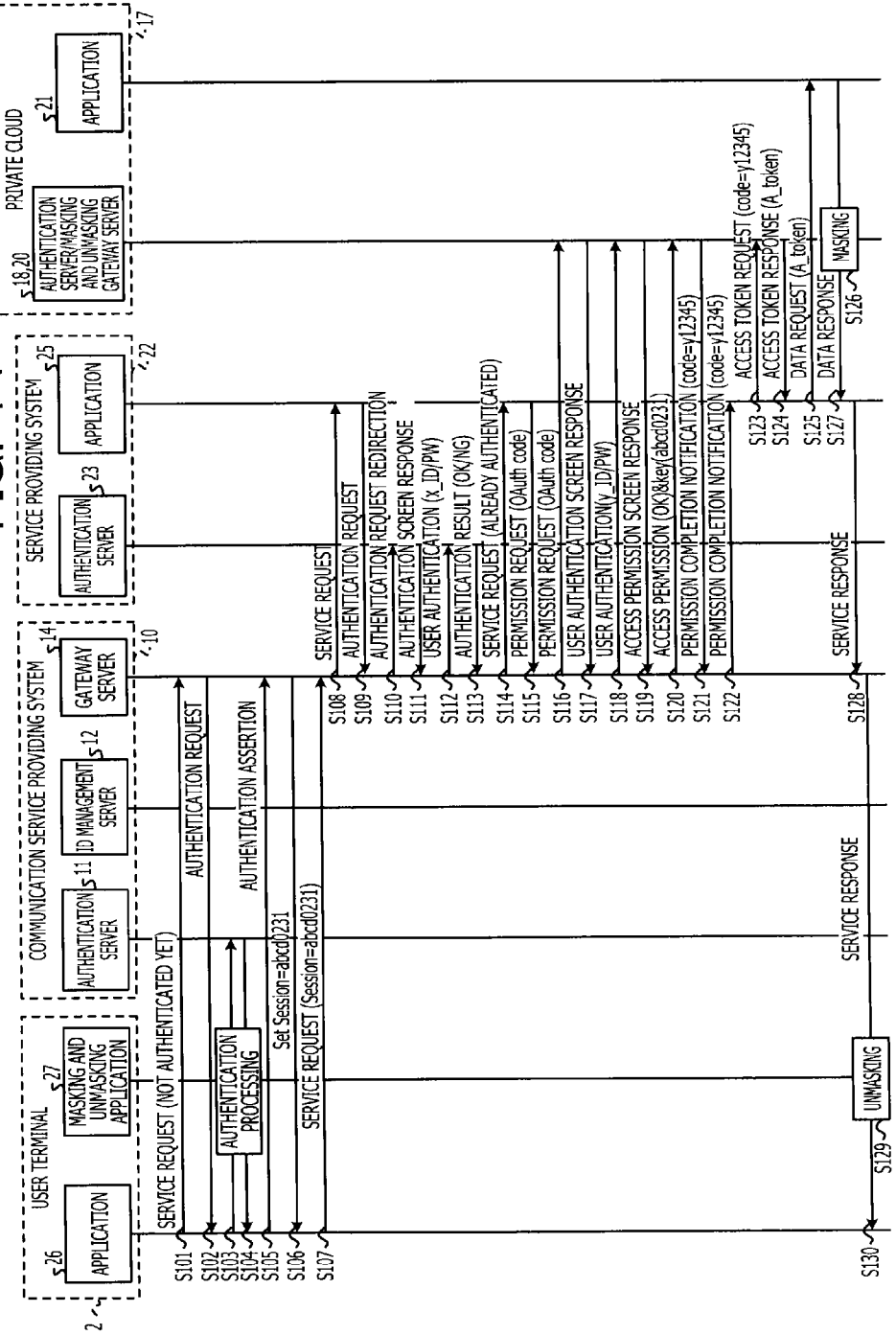
FIG. 14 is a sequence diagram for explaining an authentication method of a communication system according to the first embodiment.

Next, using FIG. 14, the flow of authentication the communication system 1 executes will be described. FIG. 14 is a sequence diagram for explaining the authentication method of a communication system according to the first embodiment. As illustrated in FIG. 14, the application 26 in the user terminal 2 transmits a service request not authenticated yet to the gateway server 14 (step S101). In response to this, the gateway server 14 transmits an authentication request to the application 26 (step S102). Therefore, the application 26 executes authentication processing with the authentication server 11 (steps S103 and S104).

Next, the application 26 transmits an authentication assertion to the gateway server 14 (step S105). In response to this, the gateway server 14 establishes a session and transmits, to the application 26, Set Session giving notice of the session ID "abcd0231" (step S106). After that, the application 26 transmits, to the gateway server 14, a service request whose session ID is the "abcd0231" (step S107).

Next, the gateway server 14 transmits the service request to the application 25 in the service providing system 22 (step S108). In response to this, the application 25 transmits, to the gateway server 14, an authentication request to be redirected and transmitted to the authentication server 23 (step S109). Therefore, the gateway server 14 transmits authentication request redirection to the authentication server 23 (step S110).

In response to this, the authentication server 23 transmits an authentication screen response to the gateway server 14 (step S111). Therefore, the gateway server 14 transmits an ID "x_ID" and a password "PW" to the authentication server 23, and performs user authentication (step S112). In response to this, the authentication server 23 transmits, to the gateway server 14, an authentication result including "OK" or "NG".

Next, the gateway server 14 transmits an already authenticated service request to the application 25 (step S114). In addition, the application 25 transmits, to the gateway server 14, a permission request including an OAuth code (step S115). Therefore, the gateway server 14 transmits, to the private cloud 17, the permission request including the OAuth code (step S116).

In response to this, the authentication server 18 transmits a user authentication screen response to the gateway server 14 (step S117). Therefore, the gateway server 14 transmits, to the authentication server 18, user authentication including an ID "y_ID" and the password "PW" (step S118). Next, the authentication server 18 transmits an access permission screen response to the gateway server 14 (step S119). Therefore, the gateway server 14 transmits access permission and the "abcd0231" serving as an encryption key, to the masking and unmasking gateway server 20 (step S120).

Next, the masking and unmasking gateway server 20 transmits, to the gateway server 14, a permission completion notification including an authentication code "y12345" (step S121). Therefore, the gateway server 14 transmits, to the application 25 in the service providing system 22, the permission completion notification including the authentication code "y12345" (step S122).

Next, the application 25 transmits, to the authentication server 18, an access token request including the authentication code "y12345" (step S123). In response to this, the authentication server 18 transmits, to the application 25, an access token response including the access token "A_token" (step S124). Next, the application 25 transmits, to the application 21, a data request including the access token "A_token" (step S125).

In response to this, the masking and unmasking gateway server 20 masks the data of the data response the application 21 has transmitted, with defining the "abcd0231" as an initial vector (step S126), and transmits the data to the application 25 (step S127). After that, the application 25 transmits a service response to the gateway server 14 (step S128).

In addition, the gateway server 14 transmits the service response to the user terminal 2. In response to this, the masking and unmasking application 27 unmasks the data masked with the "abcd0231" as the initial vector (step S129), and transmits the data to the application 26 (step S130).

Figure 15:
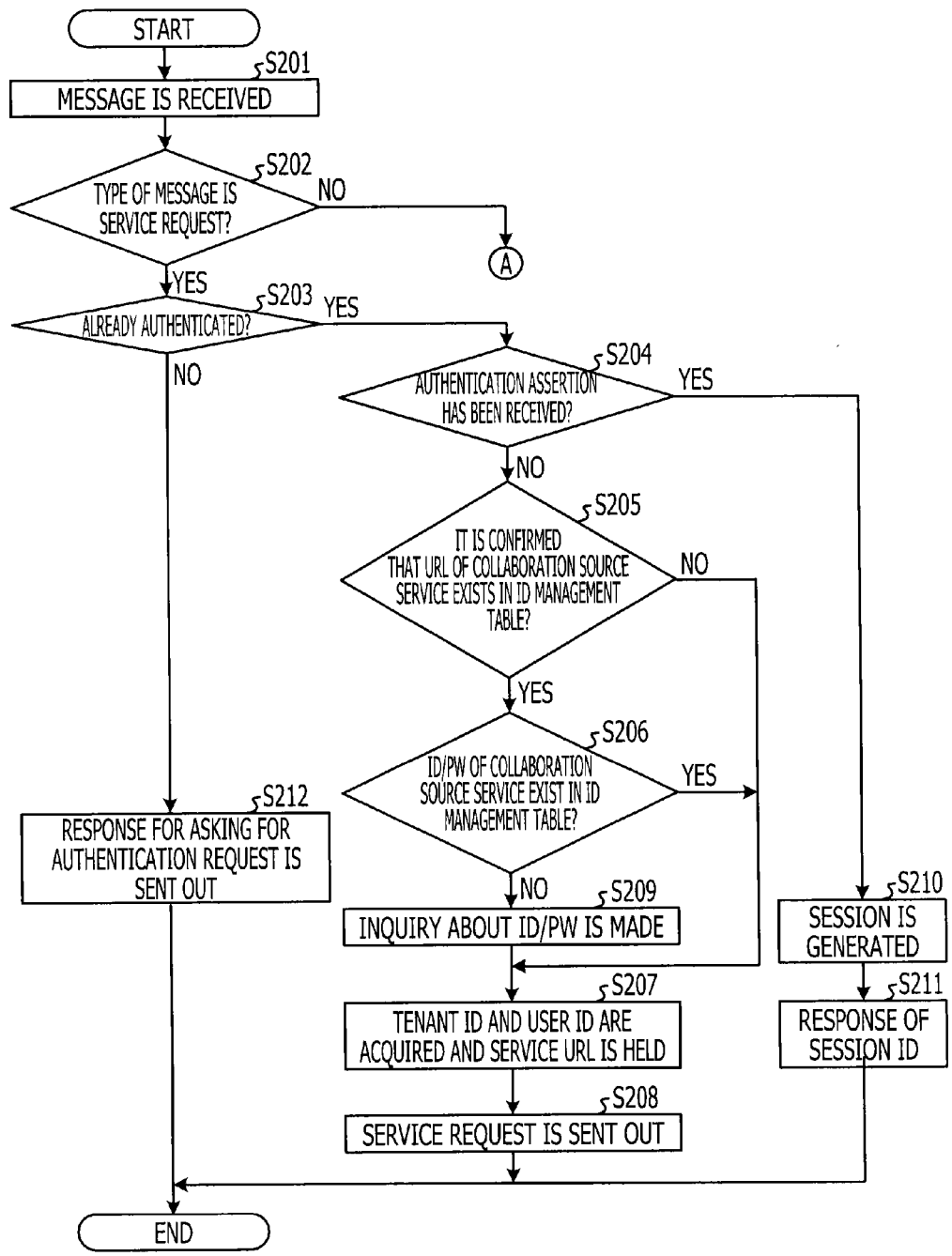
FIG. 15 is a first flowchart for explaining a flow of processing the gateway server according to the first embodiment executes.
Figure 16:
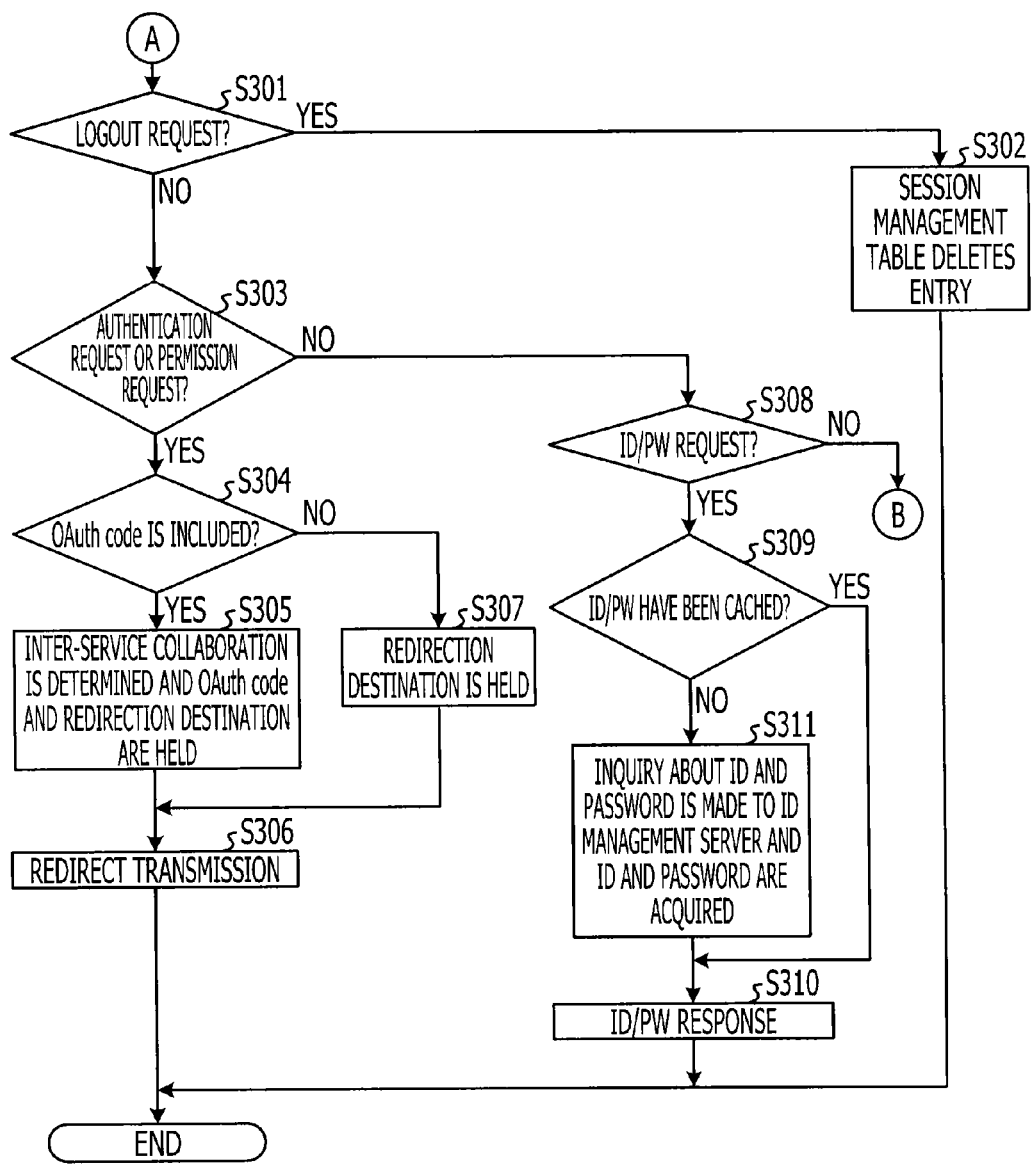
FIG. 16 is a second flowchart for explaining a flow of processing the gateway server according to the first embodiment executes.
Figure 17:
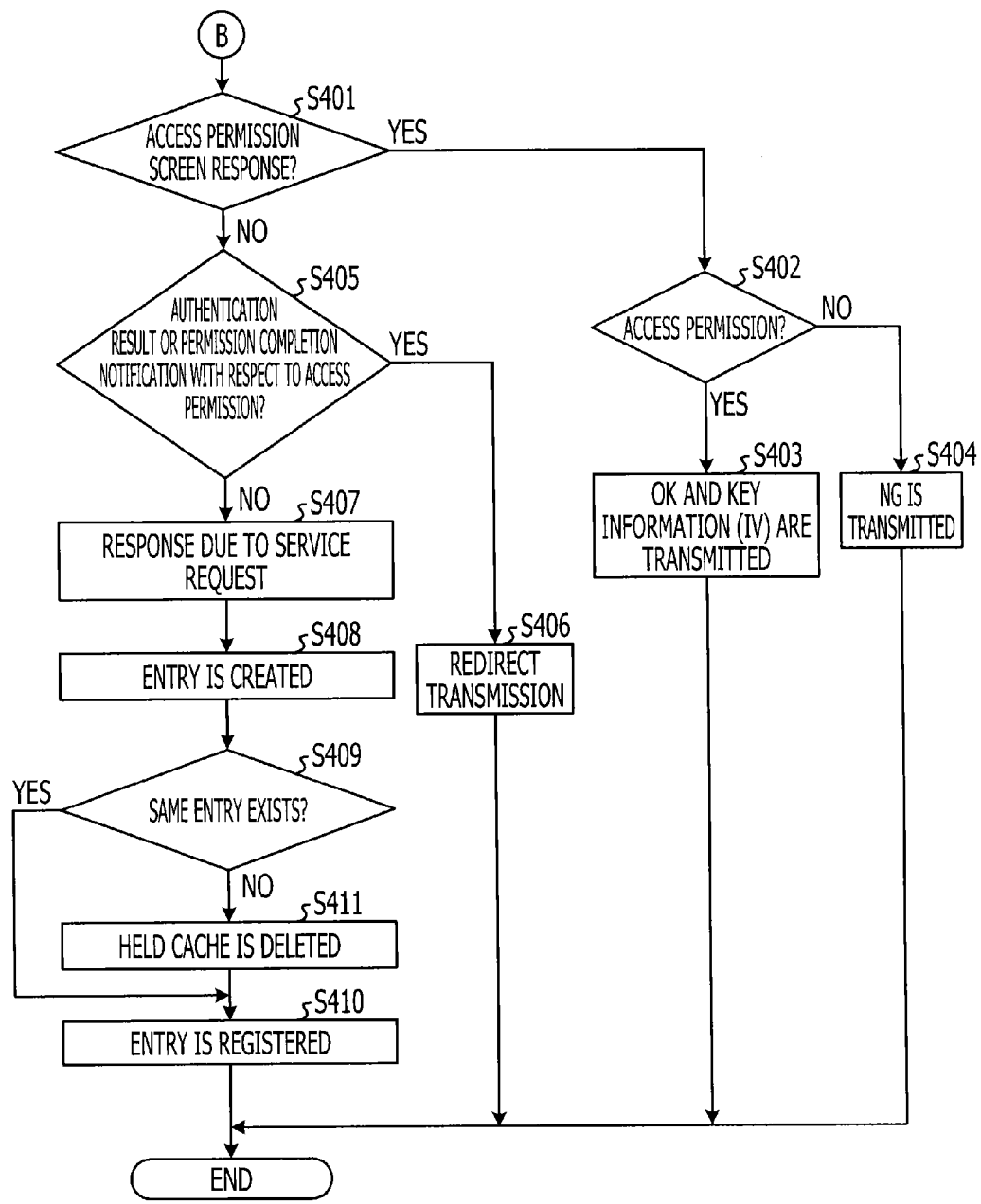
FIG. 17 is a third flowchart for explaining a flow of processing the gateway server according to the first embodiment executes.

Next, using FIGS. 15 and 14, the flow of processing the gateway server 14 executes will be described. FIG. 15 is a first flowchart for explaining the flow of processing the gateway server according to the first embodiment executes. FIG. 16 is a second flowchart for explaining the flow of processing the gateway server according to the first embodiment executes. FIG. 17 is a third flowchart for explaining the flow of processing the gateway server according to the first embodiment executes.

First, the gateway server 14 receives a message such as OAuth authentication or a service request (step S201). In response to this, the gateway server 14 determines whether the type of the received message is a service request (step S202). In addition, when the message is the service request (step S202: affirmative), the gateway server 14 determines whether the transmission source of the service request has already been authenticated (step S203).

In addition, when the transmission source of the service request has already been authenticated (step S203: affirmative), the gateway server 14 determines whether an authentication assertion has been received (step S204). In addition, when the authentication assertion has not been received (step S204: negative), the gateway server 14 confirms whether the service URL of a collaboration source service to process the received service request exists in the ID management table 13 (step S205). For example, when having received a service request with respect to the service providing system 22, the gateway server 14 confirms whether the service URL of the service providing system 22 exists in the ID management table 13.

In addition, when the service URL of the collaboration source service exists in the ID management table 13 (step S205: affirmative), the gateway server 14 determines whether the ID and PW of the collaboration source service exist (step S206). In addition, when the ID and PW of the collaboration source service exist in the ID management table 13 (step S206: affirmative), the gateway server 14 acquires the service URL from the ID management table 13.

After that, the gateway server 14 caches the acquired service URL (step S207). Next, the gateway server 14 sends out the service request to the cached service URL (step S208), and terminates processing.

On the other hand, when no collaboration candidate exists in the ID management table (step S205: negative) or when the ID and PW of the collaboration candidate exist in the ID management table 13 (step S206: affirmative), the gateway server 14 executes a step S207. In addition, when the ID and PW of the collaboration candidate do not exist in the ID management table 13 (step S206: negative), the gateway server 14 makes an inquiry to the user terminal 2 about the ID and PW (step S209). In addition, while the gateway server 14 stores, in the ID management table 13, the ID and PW received, as a result of the inquiry, from the user terminal 2, the gateway server 14 may also cache a given number of IDs and PWs.

In addition, when having received an authentication assertion (step S204: affirmative), the gateway server 14 generates a session (step S210), responds to the user terminal 2 with the session ID (step S211), and terminates processing. On the other hand, when the transmission source of the service request has not been authenticated yet (step S203: negative), the gateway server 14 sends out a response for asking for an authentication request, to the user terminal 2 (step S212), and terminates processing.

On the other hand, when the message type is not the service request (step S202: negative), the gateway server 14 starts processing illustrated in FIG. 16 (A in FIG. 15). Hereinafter, processing illustrated in FIG. 16 will be described. First, the gateway server 14 determines whether the received message is a logout request (step S301).

In addition, when the received message is the logout request (step S301: affirmative), the gateway server 14 executes the following processing. In other words, the gateway server 14 deletes, from the session management table 36, an entry including the session ID indicating the session established with the user terminal 2 serving as the transmission source of the logout request (step S302), and terminates processing.

In addition, when the received message is not the logout request, the gateway server 14 determines whether the received message is an authentication request or a permission request (step S303). In other words, the gateway server 14 whether the received message is the authentication request received in the step S109 in FIG. 14 or the permission request received in the step S115 in FIG. 14 (step S303).

In addition, when the received message is the authentication request or the permission request (step S303: affirmative), the gateway server 14 determines whether an OAuth code is included in the message (step S304). In other words, the gateway server 14 determines whether the received message is the permission request.

In addition, when the OAuth code is included (step S304: affirmative), the gateway server 14 determines inter-service collaboration and holds the OAuth code and a redirection destination (step S305). After that, the gateway server 14 transmits a permission request to the held redirection destination (step S306), and terminates processing. For example, the gateway server 14 transmits the permission request to the authentication server 18.

On the other hand, when the OAuth code is not included (step S304: negative), the gateway server 14 holds the redirection destination (step S307), transmits an authentication request to the held redirection destination (step S306), and terminates processing. For example, the gateway server 14 transmits the authentication request to the authentication server 23.

In addition, when the received message is not the authentication request or the permission request (step S303: negative), the gateway server 14 determines whether the received message is an ID/PW request for asking for an ID and a password used for authentication (step S308). Next, when the received message is the ID/PW request (step S308: affirmative), the gateway server 14 determines whether the requested ID and password have been cached (step S309).

In addition, when the ID and the password have been cached (step S309: affirmative), the gateway server 14 responds with the ID and the password (step S310), and terminates processing. On the other hand, when the ID and the password have not been cached (step S309: negative), the gateway server 14 makes an inquiry to the ID management server 12 about the ID and the password and acquires the ID and the password (step S311), and responds with the acquired ID and password (step S310).

On the other hand, when the received message is not the ID/PW request (step S308), the gateway server 14 starts processing illustrated in FIG. 17 (B in FIG. 16). In other words, the gateway server 14 determines whether the received message is an access permission screen response for asking for permission to transmit data to the service providing system 22 (step S401).

In addition, when the received message is the access permission screen response (step S401: affirmative), the gateway server 14 determines whether to permit an access (step S402). For example, the gateway server 14 presents the content and condition of data to be the target of access permission to the user terminal 2, and promotes determination of whether to permit an access.

In addition, when an access is to be permitted, for example, the gateway server 14 has received, from the user terminal 2, a notification to the effect that an access is to be permitted (step S402: affirmative), the gateway server 14 performs the following processing. In other words, the gateway server 14 transmits, to the private cloud 17, access permission that includes "OK" indicating access permission and key information "IV" serving as the session ID indicating the session established with the user terminal 2 (step S403), and terminates processing.

On the other hand, when an access is not permitted (step S402: negative), the gateway server 14 transmits "NG" to the private cloud 17 (step S404), and terminates processing.

In addition, when the received message is not the access permission screen response (step S401: negative), the gateway server 14 determines whether the received message is the authentication result of user authentication or a permission completion notification with respect to access permission (step S405). In other words, the gateway server 14 determines whether the received message is the authentication result received in the step S113 or the permission completion notification received in the step S121 in FIG. 14.

In addition, when the received message is the authentication result or the permission completion notification (step S405: affirmative), the gateway server 14 redirects and transmits the service request or the permission completion notification (step S406), and terminates processing.

On the other hand, when the received message is not the authentication result or the permission completion notification (step S405: negative), the gateway server 14 determines that the received message is a response due to the service request (step S407). In addition, the gateway server 14 creates an entry of the session management table 36 (step S408), and determines whether the same entry has already existed in the session management table 36 (step S409).

Next, when the same entry exists in the session management table 36 (step S409: affirmative), the gateway server 14 deletes the held cache (step S410), and terminates processing. In addition, when the same entry does not exist in the session management table 36 (step S409: negative), the gateway server 14 registers the entry in the session management table 36 (step S411), and executes a step S410.

As described above, when having received, from the user terminal 2, the service request made to the service providing system 22 that acquires data from the private cloud 17 and provides a service, the gateway server 14 establishes a session with the user terminal 2. In addition, the gateway server 14 transmits the service request to the service providing system 22.

In addition, from the private cloud 17, the gateway server 14 receives an inquiry about whether to transmit data to the service providing system 22. In such a case, along with whether to transmit data, the gateway server 14 transmits the session ID indicating the session established with the user terminal 2, as an encryption key used for encrypting a range to be masked from among the data.

Therefore, the gateway server 14 easily replaces an encryption key. In addition, when the private cloud 17 transmits data to the service providing system 22, the gateway server 14 gives notice of the session ID indicating the session with the user terminal 2, as an encryption key. Therefore, the gateway server 14 causes an analysis result the user terminal 2 receives to be decrypted. In addition, since the gateway server 14 replaces with a new encryption key and a new decryption key every time a session is updated, toughness is improved.

In addition, since the gateway server 14 notifies the user terminal 2 of the session ID as the decryption key, the range the private cloud 17 has encrypted is correctly decrypted.

In addition, in the past, so as to perform encryption or decryption, there has been known a method for executing a key replacement phase, such as Security Architecture for Internet Protocol (IPsec), Secure Socket Layer (SSL), or Transport Layer Security (TLS). In addition, there has been known a method for generating a key using a time, such as a one-time password. However, in the method of the related art for key replacement, since a protocol for performing key replacement between the user terminal 2 and the private cloud 17 is introduced in addition to time synchronization and an increase in a calculation amount, processing becomes complicated.

On the other hand, the gateway server 14 defines, as an encryption key, the session ID indicating the session with the user terminal 2, and transmits the encryption key to the private cloud 17 in the confirmation phase of the OAuth authentication. In addition, the gateway server 14 transmits, to the user terminal 2, the session ID as a decryption key. Therefore, without introducing a new protocol, the gateway server 14 realizes key replacement between the user terminal 2 and the private cloud 17.

In addition, the gateway server 14 stores therein the user ID and the session ID indicating the session established with the user indicated by the user ID with associating the user ID and the session ID with each other. In addition, the gateway server 14 transmits, to the private cloud 17, the session ID stored with being associated with the user ID indicting the user who has transmitted the service request. Therefore, even if having received service requests from a plurality of different users, the gateway server 14 also gives notice of a different encryption key with respect to each user.

In addition, using the authentication server 11, the gateway server 14 determines whether the user terminal 2 serving as the transmission source of the service request is a legitimate user, and when it is determined that the user terminal 2 is the legitimate user, the gateway server 14 establishes a session with the user terminal 2. Therefore, since the gateway server 14 avoids transmitting an analysis result to an illegal user, browsing of data due to the illegal user is avoided.

In addition, the ID management server 12 includes the ID management table 13 where an ID and a password, used for performing authentication of the private cloud 17 and the service providing system 22, are associated with each other with respect to each user. In addition, the gateway server 14 acquires an ID and a password, associated with a user serving as the transmission source of a service request in the ID management table 13, and performs authentication of the private cloud 17 and the service providing system 22, using the acquired ID and password.

After that, the gateway server 14 transmits the service request to the service providing system 22, and transmits, as an encryption key, the session ID indicating the session with the user terminal 2, to the private cloud 17. Therefore, the gateway server 14 performs proxy authentication with respect to the private cloud 17 and the service providing system 22. In addition, when a plurality of users receive services the private cloud 17 and the service providing system 22 provide, the gateway server 14 also easily perform key replacement between each user and the private cloud 17.

In addition, the gateway server 14 notifies the private cloud 17 and the user terminal 2 of the session ID, as an encryption key and the initial vector of an decryption key. Therefore, the gateway server 14 realizes secure encryption without increasing the number of bits of the session ID to the number of bits secure as an encryption key. In addition, since having no common key, the gateway server 14 avoids browsing of masked data, performed owing to the gateway server 14 itself.

While an embodiment of the present application has been described as above, an embodiment may also be implemented in various different forms in addition to the above-mentioned embodiment. Therefore, hereinafter, as a second embodiment, another embodiment according to the present application will be described.

(1) As for Communication Service Providing System

The above-mentioned communication service providing system 10 includes the authentication server 11, the ID management server 12, and the plural gateway servers 14 to 16. However, an embodiment is not limited to this. For example, if a specific gateway server, for example, the gateway server 14, receives a service request the user terminal 2 has transmitted, the gateway server 14 may also include functions the authentication server 11 and the ID management server 12 include.

(2) As for Collaboration Destination Service and Collaboration Source Service

The above-mentioned communication system 1 includes the private cloud 17 providing a collaboration destination service. However, an embodiment is not limited to this. For example, the communication system 1 may also include a plurality of private clouds providing the same service as the private cloud 17.

In addition, in addition to the service providing system 22 providing the analysis service, the communication system 1 may also include a plurality of service providing systems providing the same collaboration source service. In addition, services individual service providing systems provide may also be equal to one another or may also be different from one another. In addition, the private cloud 17 or the service providing system 22, which provides a service, may also provide a service due to a specific server or the like or a service utilizing cloud computing.

(3) As for Encryption Key

The above-mentioned gateway server 14 transmits, to the private cloud 17 and the user terminal 2, a session ID indicating a session established with the user terminal 2, as an encryption key and the initial vector of a decryption key. However, an embodiment is not limited to this, and, for example, the gateway server 14 may also transmit, to the private cloud 17 and the user terminal 2, the session ID as a common key.

For example, the user terminal 2 and the private cloud 17 store therein a key generation common function. In addition, the user terminal 2 and the private cloud 17 calculate a key generation common function using session information, and calculate a common key. In addition, the private cloud 17 adds, as an initial vector, 16 bytes of random data to the head of a range to be masked, and encrypts the data. In addition, the user terminal 2 may extract the initial vector from the calculated common key and the data, and may also perform decryption using the extracted initial vector.

In addition, the gateway server 14 may also transmit the common key and the initial vector to the user terminal 2 and the private cloud 17.

(4) Program

Figure 18:
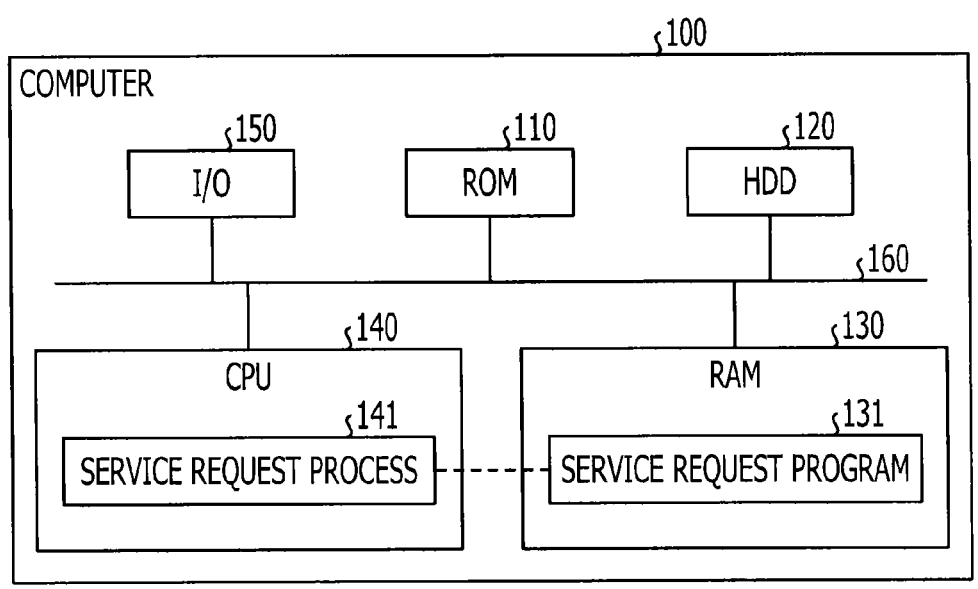
FIG. 18 is a diagram for explaining an example of a computer executing a service request program.

Incidentally, as for the gateway server 14 according to the first embodiment, a case has been described where various kinds of processing operations are realized using hardware. However, an embodiment is not limited to this, and by a computer executing a program prepared in advance, the various kinds of processing operations may also be realized. Therefore, hereinafter, using FIG. 18, an example of a computer will be described, the computer executing a program having the same function as the gateway server 14 illustrated in the first embodiment. FIG. 18 is a diagram for explaining an example of a computer executing a service request program.

In a computer 100 exemplified in FIG. 18, a Read Only Memory (ROM) 110, a Hard Disk Drive (HDD) 120, and a Random Access Memory (RAM) 130 are coupled to one another using a bus 160. In addition, in the computer 100 exemplified FIG. 18, a Central Processing Unit (CPU) 140 and an Input Output (I/O) 150 are coupled to each other using the bus 160.

In the HDD 120, the same information as the ID management table 13 and the session management table 36 is preliminarily stored. In the RAM 130, a service request program 131 is preliminarily stored. The CPU 140 reads and executes the service request program 131 from the RAM 130, and hence the CPU 140 functions as a service request process 141, in the example illustrated in FIG. 18. In addition, the service request process 141 fulfills the same function as the gateway server 14 illustrated in FIG. 6.

In addition, a program prepared in advance is executed by a computer such as a personal computer or a workstation, and hence, the service request program described in the present embodiment is realized. This program is distributed through a network such as Internet. In addition, this program is recorded in a computer-readable recording medium such as a hard disk, a flexible disk (FD), a Compact Disc Read Only Memory (CD-ROM), a Magneto Optical Disc (MO), or a Digital Versatile Disc (DVD). In addition, this program is read from the recording medium by the computer, and hence, executed.

According to the above-mentioned embodiments, the change or the acceptance or delivery of the encryption key becomes easy.

All examples and conditional language recited herein are intended for pedagogical purposes to aid the reader in understanding the invention and the concepts contributed by the inventor to furthering the art, and are to be construed as being without limitation to such for example recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A device comprising:
a memory; and
a processor coupled to the memory and configured to
    establish a session with a request source that requests, to the device, a service from a second providing source the second providing source providing the service based on data stored in a first providing source;
    receive, from the first providing source an inquiry about whether the first providing source is permitted to transmit the data to the second providing source; and
    notify the first providing source of session information indicating the session established with the request source as an encryption key to encrypt a mask range of the data and notification of permission for transmitting the data to the second providing source when the first providing source is permitted to transmit the data to the second providing source.

2. The device according to claim 1, wherein the processor is configured to notify information indicating the request source in addition to the session information.

3. The device according to claim 1, wherein the processor is configured to determine whether the request source is a legitimate request source, and establish the session when it has been determined that the request source is the legitimate request source.

4. The device according to claim 1, wherein the processor is configured to:
    perform authentication of the request source before establishment of the session when receiving a request for the service; and
    notify the session information to the first providing source after the request source has been authenticated.

5. The device according to claim 1, wherein the session information is an initial vector for an encryption of the mask range of the data.

6. A method comprising:
- establishing a session with a request source that requests a service from a second providing source, the second providing source providing the service based on data stored in a first providing source;
- receive, from the first providing source, an inquiry about whether the first providing source is permitted to transmit the data to the second providing source; and
- notifying, by a computer, the first providing source of session information indicating the session established with the request source as an encryption key to encrypt a mask range of the data and a notification of permission for transmitting the data to the second providing source when the first providing source is permitted to transmit the data to the second providing source.

7. The method according to claim 6, wherein the notifying includes indicating the request source in addition to the session information.

8. The method according to claim 6, further comprising:
- determining whether the request source is a legitimate request source, wherein
- the session is established when it has been determined that the request source is the legitimate request source.

9. The method according to claim 6, further comprising:
- performing authentication of the request source before establishment of the session when receiving a request for the service; and
- notifying the session information to the first providing source after the request source has been authenticated.

10. The method according to claim 6, wherein the session information is an initial vector for an encryption of the mask range of the data.

11. A non-transitory computer-readable recording medium having stored therein a program for causing a client apparatus to execute a digital signature process comprising:
- establishing a session with a request source that requests a service from a second providing source, the second providing source providing the service based on data stored in a first providing source;
- receive, from the first providing source, an inquiry about whether the first providing source is permitted to transmit the data to the second providing source; and
- notifying, by a computer, the first providing source of session information indicating the session established with the request source as an encryption key to encrypt a mask range of the data and a notification of permission for transmitting the data to the second providing source when the first providing source is permitted to transmit the data to the second providing source.

12. The non-transitory computer-readable recording medium according to claim 11, wherein the notifying includes indicating the request source in addition to the session information.

13. The non-transitory computer-readable recording medium according to claim 11, wherein the digital signature process comprises:
- determining whether the request source is a legitimate request source, wherein
- the session is established when it has been determined that the request source is the legitimate request source.

14. The non-transitory computer-readable recording medium according to claim 11, wherein the digital signature process comprises:
- performing authentication of the request source before establishment of the session when receiving a request for the service; and
- notifying the session information to the first providing source after the request source has been authenticated.

15. The non-transitory computer-readable recording medium according to claim 11, wherein the session information is an initial vector for an encryption of the mask range of the data.

* * * * *

UNITED STATES PATENT AND TRADEMARK OFFICE
CERTIFICATE OF CORRECTION

PATENT NO. : 8,925,046 B2  
APPLICATION NO. : 13/775707  
DATED : December 30, 2014  
INVENTOR(S) : Takao Ogura et al.

Page 1 of 1

It is certified that error appears in the above-identified patent and that said Letters Patent is hereby corrected as shown below:

On the title page after item (65) insert the following:
item --(30) Foreign Application Priority Data
May 21, 2012 (JP) 2012-115905--

Signed and Sealed this
Twenty-first Day of April, 2015

Michelle K. Lee
*Director of the United States Patent and Trademark Office*